US006993906B1

(12) United States Patent  
Smothers et al.

(10) Patent No.: US 6,993,906 B1  
(45) Date of Patent: Feb. 7, 2006

(54) HYDRAULIC DRIVE APPARATUS

(75) Inventors: Daryl Smothers, Sullivan, IL (US); Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 84 days.

(21) Appl. No.: 10/699,637

(22) Filed: Oct. 31, 2003

Related U.S. Application Data

(63) Continuation of application No. 10/178,873, filed on Jun. 24, 2002, now abandoned, which is a continuation of application No. 09/774,754, filed on Jan. 30, 2001, now Pat. No. 6,427,443, which is a continuation of application No. 09/170,915, filed on Oct. 13, 1998, now Pat. No. 6,192,682, which is a continuation of application No. 08/700,933, filed on Aug. 23, 1996, now Pat. No. 5,819,535, which is a continuation of application No. 08/451,162, filed on May 26, 1995, now Pat. No. 5,557,931, which is a continuation-in-part of application No. 08/394,144, filed on Feb. 24, 1995, now Pat. No. 5,555,727.

(51) Int. Cl.  
*F16D 39/00* (2006.01)

(52) U.S. Cl. .......................... 60/487; 60/488  
(58) Field of Classification Search ............... 60/487, 60/488, 454, 464, 486  
See application file for complete search history.

(56) References Cited

U.S. PATENT DOCUMENTS

| 2,777,286 | A | 1/1957 | Badalini |
| 2,975,597 | A | 3/1961 | Arz |
| 3,175,363 | A | 3/1965 | Molly |
| 3,213,616 | A | 10/1965 | Reinke |
| 3,279,172 | A | 10/1966 | Yoshito et al. |
| 3,360,933 | A | 1/1968 | Swanson et al. |
| 3,486,335 | A | 12/1969 | Kern et al. |
| 4,041,703 | A | 8/1977 | Knapp |
| 4,189,921 | A | 2/1980 | Knapp |
| 4,274,257 | A | 6/1981 | Koch |
| 4,348,864 | A | 9/1982 | Ichmura |
| 4,366,671 | A | 1/1983 | Chichester |
| 4,606,428 | A | 8/1986 | Giere |
| 4,627,237 | A | 12/1986 | Hutson |
| 4,691,802 | A | 9/1987 | Ishimori et al. |
| 4,856,264 | A | 8/1989 | Nishimura et al. |
| 4,864,823 | A | 9/1989 | Ikejiri et al. |
| 4,905,472 | A | 3/1990 | Okada |
| 4,922,717 | A | 5/1990 | Furumoto et al. |

(Continued)

FOREIGN PATENT DOCUMENTS

GB        1126363        9/1968

OTHER PUBLICATIONS

Daikin Oil Hydraulic Equipmnet, BDX Series Hydrostatic Transmission.

(Continued)

*Primary Examiner*—F. Daniel Lopez  
(74) *Attorney, Agent, or Firm*—Neal, Gerber & Eisenberg LLP

(57) ABSTRACT

A hydrostatic drive device comprising a hydrostatic transmission mounted in a housing and a single output shaft driven by the hydrostatic transmission and extending out of the housing. The hydrostatic transmission has a center section mounted entirely within the housing and a rotatable hydraulic pump and a rotatable hydraulic motor mounted on the center section and connected through hydraulic porting in the center section. A pump shaft extends into the housing to drive the pump block, and the longitudinal axis of the output shaft is perpendicular to the longitudinal axis of the pump shaft.

20 Claims, 26 Drawing Sheets

U.S. PATENT DOCUMENTS

| | | |
|---|---|---|
| 4,967,555 A | 11/1990 | Maki et al. |
| 4,986,073 A | 1/1991 | Okada |
| 5,031,403 A | 7/1991 | Okada |
| 5,058,382 A | 10/1991 | Inoue et al. |
| 5,060,477 A | 10/1991 | Hayashi et al. |
| 5,127,215 A * | 7/1992 | Wenzel .................... 180/6.32 |
| 5,142,940 A | 9/1992 | Hasegawa |
| 5,146,748 A | 9/1992 | Okada |
| 5,218,886 A | 6/1993 | Louis et al. |
| 5,311,740 A | 5/1994 | Shiba et al. |
| 5,317,936 A | 6/1994 | Shiba et al. |
| 5,339,631 A | 8/1994 | Ohashi |
| 5,356,347 A | 10/1994 | Komura |
| 5,377,487 A | 1/1995 | Azuma et al. |
| 5,505,279 A | 4/1996 | Louis et al. |
| 5,542,307 A | 8/1996 | Hasegawa et al. |
| 5,555,727 A | 9/1996 | Hauser et al. |
| 5,557,931 A | 9/1996 | Hauser et al. |
| 5,628,189 A | 5/1997 | Hauser et al. |
| 5,819,535 A | 10/1998 | Smothers et al. |

OTHER PUBLICATIONS

Eaton Hydraulic Division, BDX Series Hydrostatic Transmission.

* cited by examiner

HYDRAULIC DRIVE APPARATUS

CROSS-REFERENCE TO RELATED APPLICATIONS

This application is a continuation of U.S. application Ser. No. 10/178,873 filed Jun. 24, 2002, now abandoned which is a continuation of U.S. application Ser. No. 09/774,754, filed Jan. 30, 2001, now U.S. Pat. No. 6,427,443, which is a continuation of U.S. application Ser. No. 09/170,915, filed Oct. 13, 1998, now U.S. Pat. No. 6,192,682, which is a continuation of application Ser. No. 08/700,933, filed Aug. 23, 1996, now U.S. Pat. No. 5,819,535, which is a continuation of 08/451,162 filed May 26, 1995 now U.S. Pat. No. 5,557,931, which is a continuation-in-part of U.S. application Ser. No. 08/394,144, filed Feb. 24, 1995, now U.S. Pat. No. 5,555,727. All of these prior applications are incorporated herein by reference.

BACKGROUND OF THE INVENTION

This invention relates to charge pumps and other auxiliary pumps used on hydrostatic transmissions ("HST") for use in light duty applications. Such HSTs can either have their own housing and be attached to an axle driving apparatus, or can be incorporated within a housing that includes the components of the axle driving apparatus. A unit that contains an HST within the housing of an axle driving apparatus is often referred to as a integrated hydrostatic transaxle ("IHT"). The operation of such units are described in U.S. Pat. Nos. 5,201,692 and 5,314,387, the terms of which are incorporated by reference.

SUMMARY OF THE INVENTION

This invention presents a unique and novel manner of providing and mounting charge pumps and auxiliary pumps for both IHTs or stand-alone HSTs that are mounted to a separate transmission. As described in the '692 patent, an HST generally comprises a pump that receives and is rotated by an input shaft driven by a vehicle engine. The pump includes a plurality of pistons that contact a swashplate to cause axial movement thereof when the pump rotates. The pump is hydraulically connected to a motor, which is similar in construction to the pump. The motor receives hydraulic fluid from the pump, and movement of the motor pistons against a swashplate causes rotation of the motor, which is connected to and drives an output shaft. The hydraulic connection between the pump and motor is a closed circuit; however, in any such circuit there will be deliberate and incidental leakage due to lubrication requirements, the high pressure of the hydraulic fluid and manufacturing tolerances. Thus, the HST requires a mechanism to replace fluid leaked from the closed circuit. This replacement fluid is commonly called make-up fluid.

In present HST designs, the pump and motor are often mounted on a center section that includes the hydraulic circuit therein. The hydraulic circuit includes two sides: a high pressure side and a low pressure side. The low pressure side is sometimes referred to as the vacuum side. These two sides are reversed when the vehicle motion is changed from forward to reverse.

Typically, the center section is mounted in a housing, and the housing provides a hydraulic fluid sump. Make-up fluid is brought from the sump into the low pressure side of the hydraulic circuit to replace fluid which is lost therefrom due to leakage. Specifically, check valves mounted directly into the center section or mounted in a separate plate that is in communication with the center section, as shown in the '692 patent, provide a fluid flow path between the sump and the hydraulic circuit. However, this arrangement often does not provide sufficient fluid flow into the low pressure side of the circuit to replace the lost fluid. Therefore, a charge pump may be used to assist in this process. In addition, the use of an auxiliary pump to supply pressurized hydraulic fluid for various purposes is generally known. This invention provides for an efficient manner of mounting a charge pump and, in some cases, an auxiliary pump, external to the housing but still in direct communication with the hydraulic circuit in the center section.

The external charge pump confers significant benefits with respect to the accessibility on the hydraulic system design and configuration. The external nature of the charge pump allows direct access via a simple hydraulic fitting to hydraulic fluid that can be used for auxiliary functions. Internal charge pumps, in comparison, generally require a complex series of chambers, connections and fittings in order for fluid to be accessible exterior to the housing. External pumps provide accessibility without unit disassembly, thereby allowing replacement, addition or upgrade of a charge or auxiliary pump. Previous configurations were not accessible without disassembly of the HST or IHT.

Additional benefits and features of this invention will be disclosed in the description of the drawings.

DETAILED DESCRIPTION OF THE EMBODIMENTS

Figure 1:
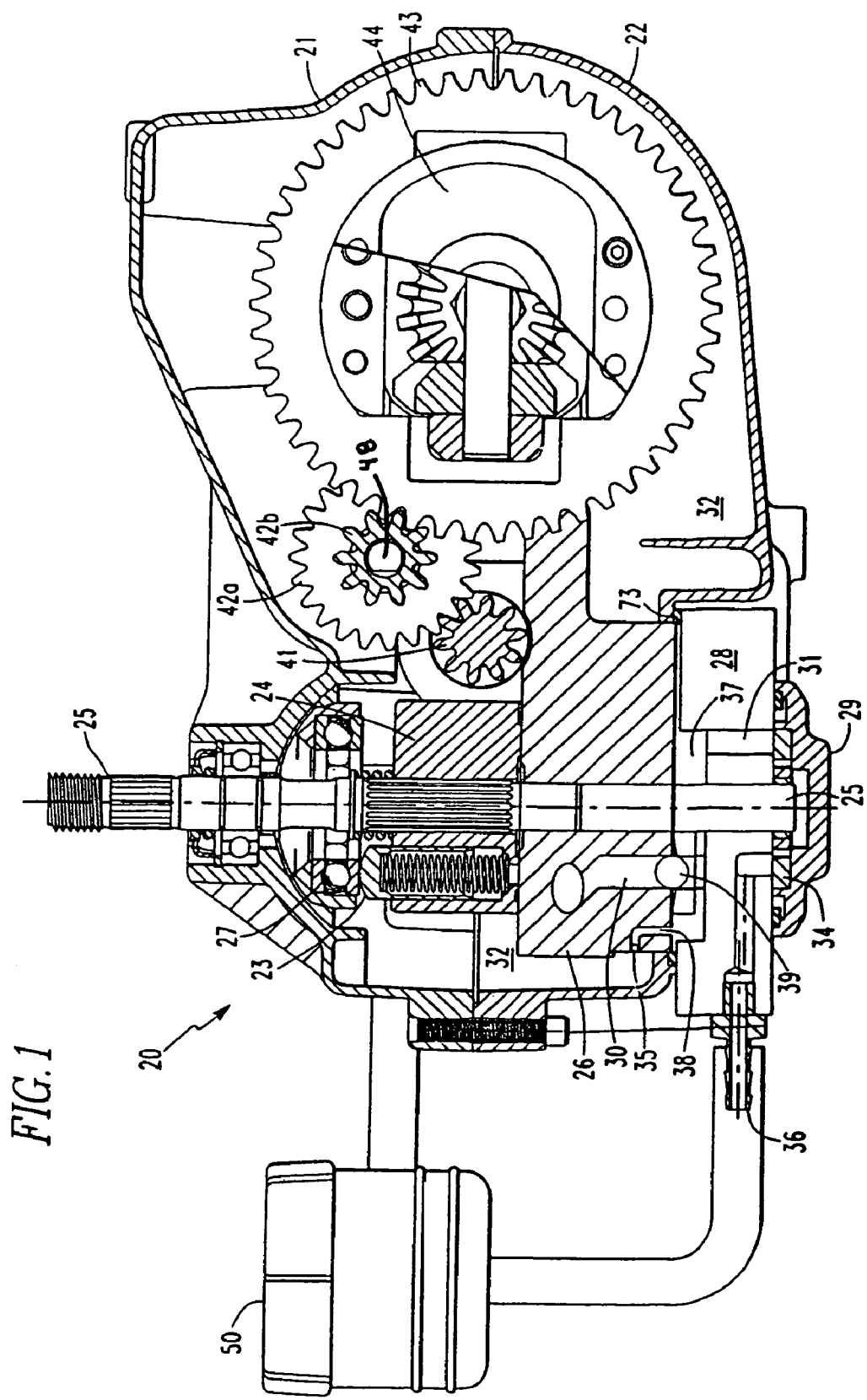
FIG. 1 is a sectional side view of a charge pump and IHT in accordance with the present invention.
Figure 2:
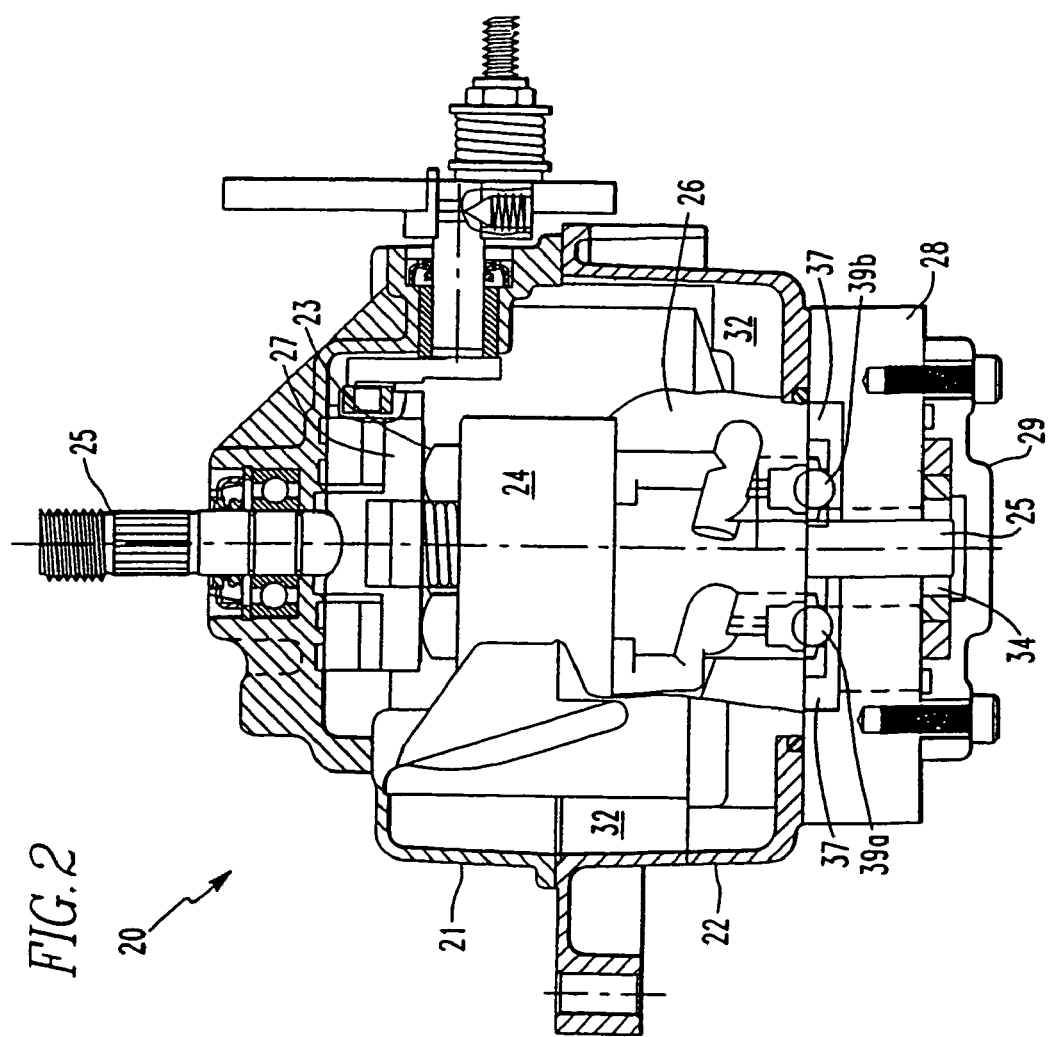
FIG. 2 is a sectional end view of the IHT shown in FIG. 1.
Figure 3:
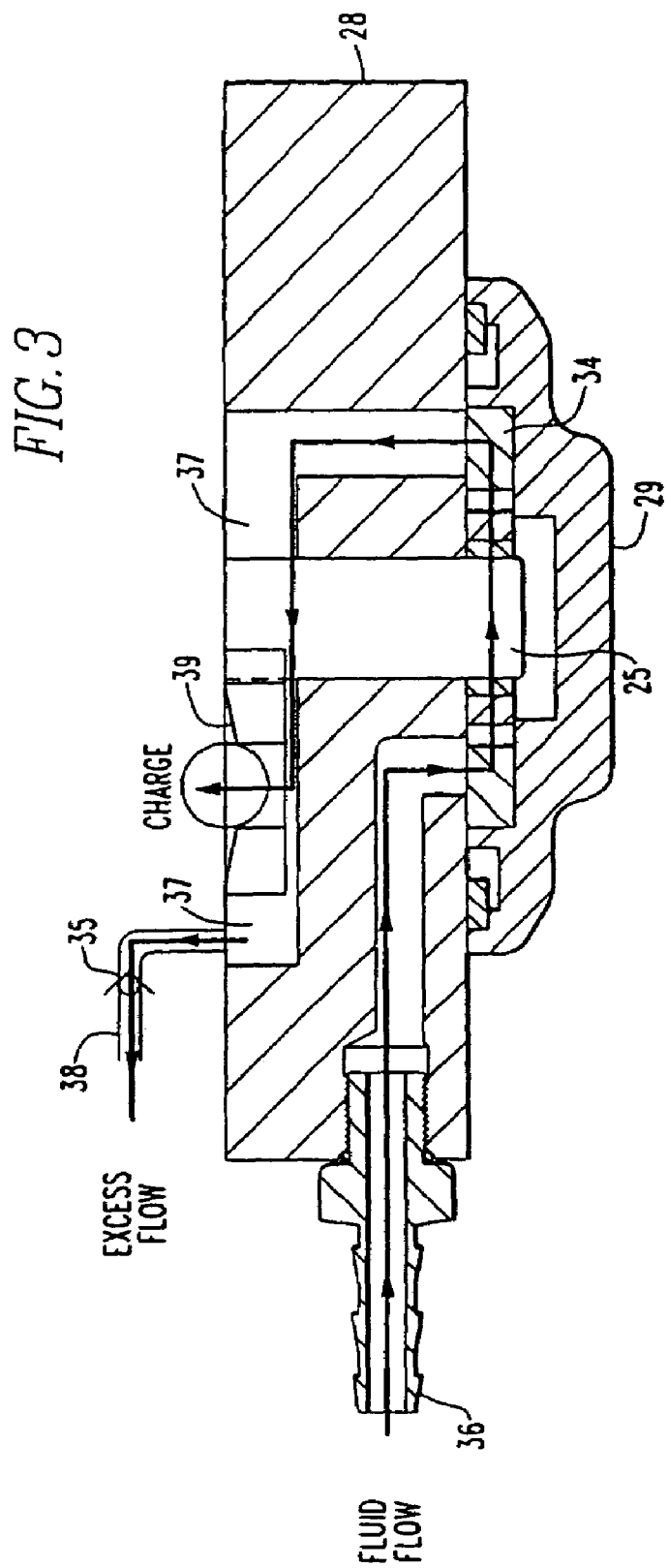
FIG. 3 is a partial sectional side view of the porting plate and charge pump of the IHT shown in FIG. 1, with a typical hydraulic fluid flow path shown.
Figure 4:
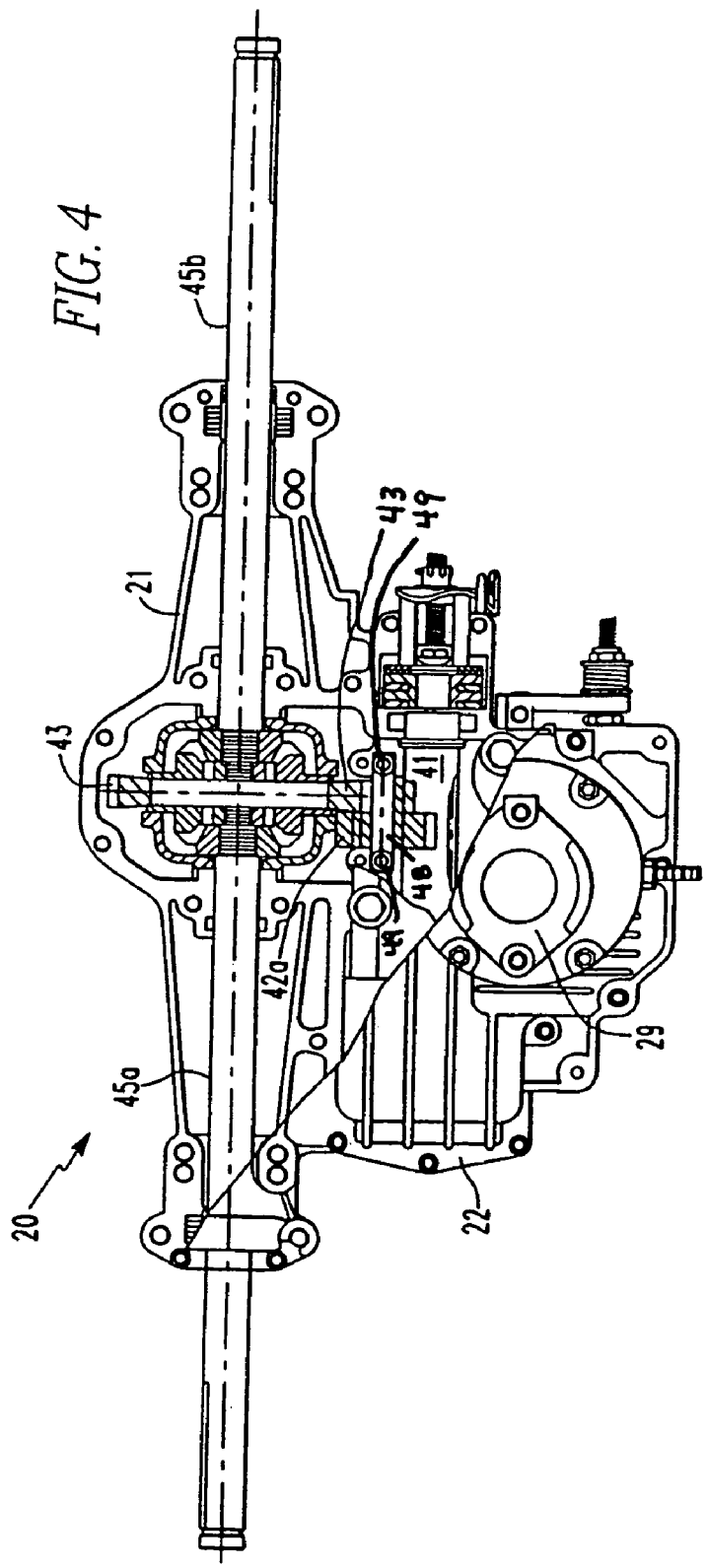
FIG. 4 is a partial sectional bottom plan view of the IHT shown in FIG. 1, with the lower housing and charge cover partially cut away.
Figure 5:
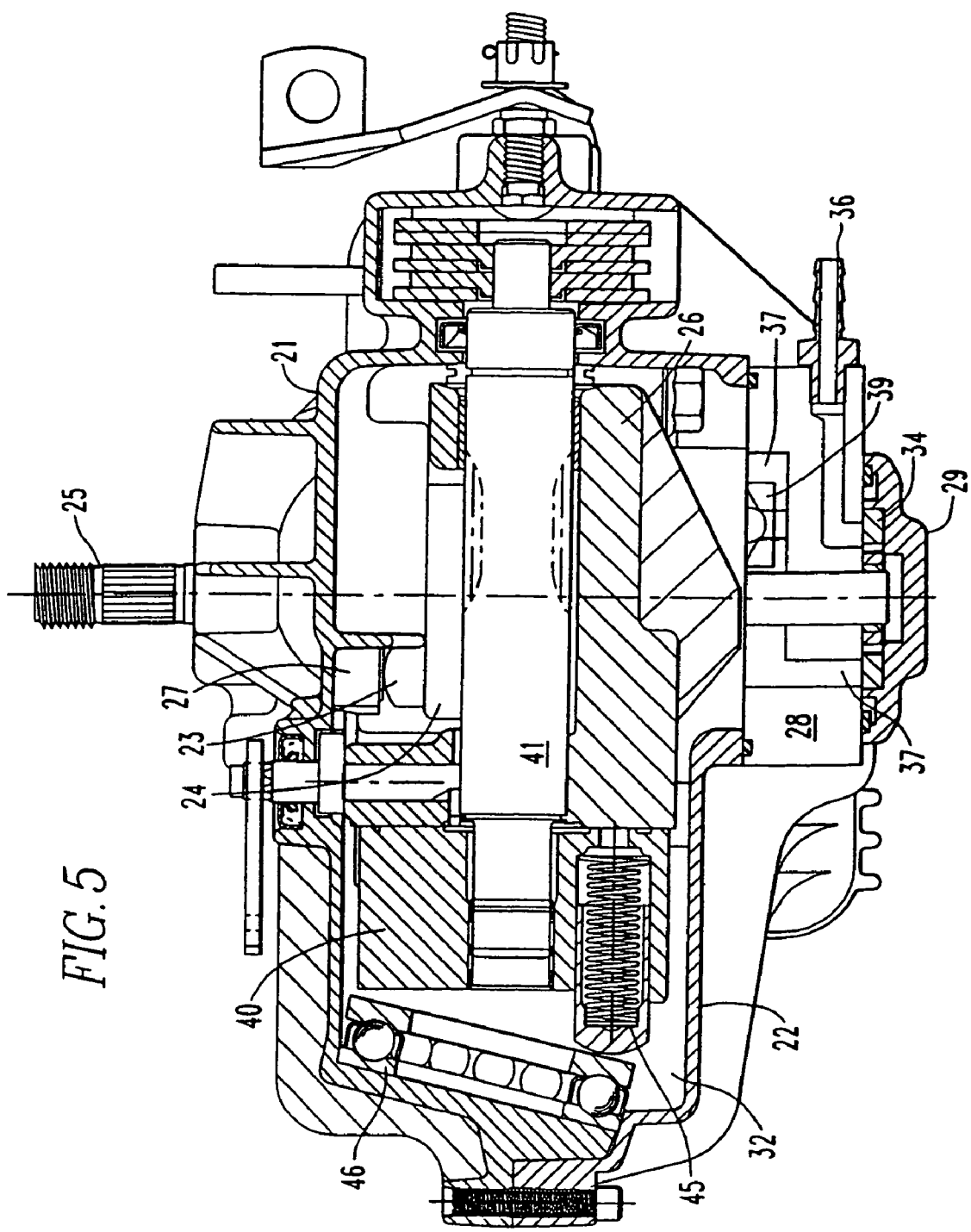
FIG. 5 is a sectional side view of the IHT shown in FIG. 1.

A charge pump embodiment of the invention incorporated in an IHT will first be described in accordance with the accompanying drawings. FIGS. 1 through 5 illustrate an IHT configured with a horizontally split housing with upper housing 21 and lower housing 22. The invention does not require any specific housing configuration, and all known configurations can be accommodated. All specifics of an IHT are not shown in these figures as the general operating of an IHT is known in the art.

Pump 24 is disposed on center section 26 and receives input shaft 25, which communicates with and is driven by a vehicle engine (not shown). Center section 26 includes internal porting 30 that hydraulically connects pump 24 and motor 40. Pump pistons 23 engage adjustable swashplate 27 to create pressure within a center section internal porting 30. Housings 21 and 22 form a sump or reservoir 32 external to center section 26. Motor 40 is connected to and drives output shaft 41, which in turn drives gear 42a, which is connected to gear 42b mounted on counter shaft 48. Gears 42a and 42b do not rotate with respect to one another; the teeth of gear 42b engage with gear 42a. As shown most clearly in FIG. 4, counter shaft 48 is mounted to lower housing 21 by means of screws 49 and is located between motor shaft 41 and axles 45a and 45b. Gear 42b then drives gear 43 and the remaining gears of differential 44. Differential 44 is in turn operatively connected to the output drive axles 45a and 45b of the vehicle. The specifics of the output gearing and differential are not essential to this invention and are disclosed in the '387 patent.

The charge pump includes an inlet porting plate 28 external to the lower housing 22 at the external surface thereof, i.e., attached to the lower housing 22. Porting plate 28 is mounted so that its interior surface is in close proximity to center section 26. Gerotor housing 29, which is also known as a charge cover, is attached to the external surface of inlet porting plate 28, and gerotor set 34 is held in position by the configuration of input shaft 25. This embodiment also includes mounting the porting plate 28 on other housing elements, or parts that may be labeled by other nomenclatures, that would perform functions similar to the described upper and lower housings. Porting plate 28 includes an inlet 36 that is connected to an external reservoir 50 that contains hydraulic fluid and which is typically mounted on a supporting member of the vehicle in which the IHT is mounted. Inlet 36 could also be in communication with and receive fluid from sump 32 instead of reservoir 50.

Input shaft 25 extends through pump 24 and center section 26 to drive gerotor set 34, which is of a standard design known in the art. Rotation of gerotor set 34 by shaft 25 creates a low pressure or suction at inlet 36 that remains constant regardless of the forward or reverse status of the HST. The porting plate 28 also includes fluid passage 31 in communication with gerotor set 34. The action of the gerotor will cause fluid forced from the gerotor set into passage 31 to become pressurized. Thus, fluid is drawn through inlet 36 by the suction created by rotation of gerotor 34; the pressurized fluid is then forced into passage 31 and then into gallery 37. Gallery 37 is formed and defined by the interface between the inlet porting plate 28 and the center section 26. In the embodiment shown in FIG. 1, lower housing 22 includes an opening for the bottom surface of center section 26 to be approximately flush with the external bottom surface of lower housing 22. The attachment location of center section 26 in upper housing 21 establishes the position of the center section 26. Other embodiments with different split lines to the housing elements would have a similar opening. The positioning of the interface between the center section and the porting plate is not critical. In the embodiment shown in FIG. 1, the interface is flush with the external housing, but may move from that position in other embodiments.

Figure 6:
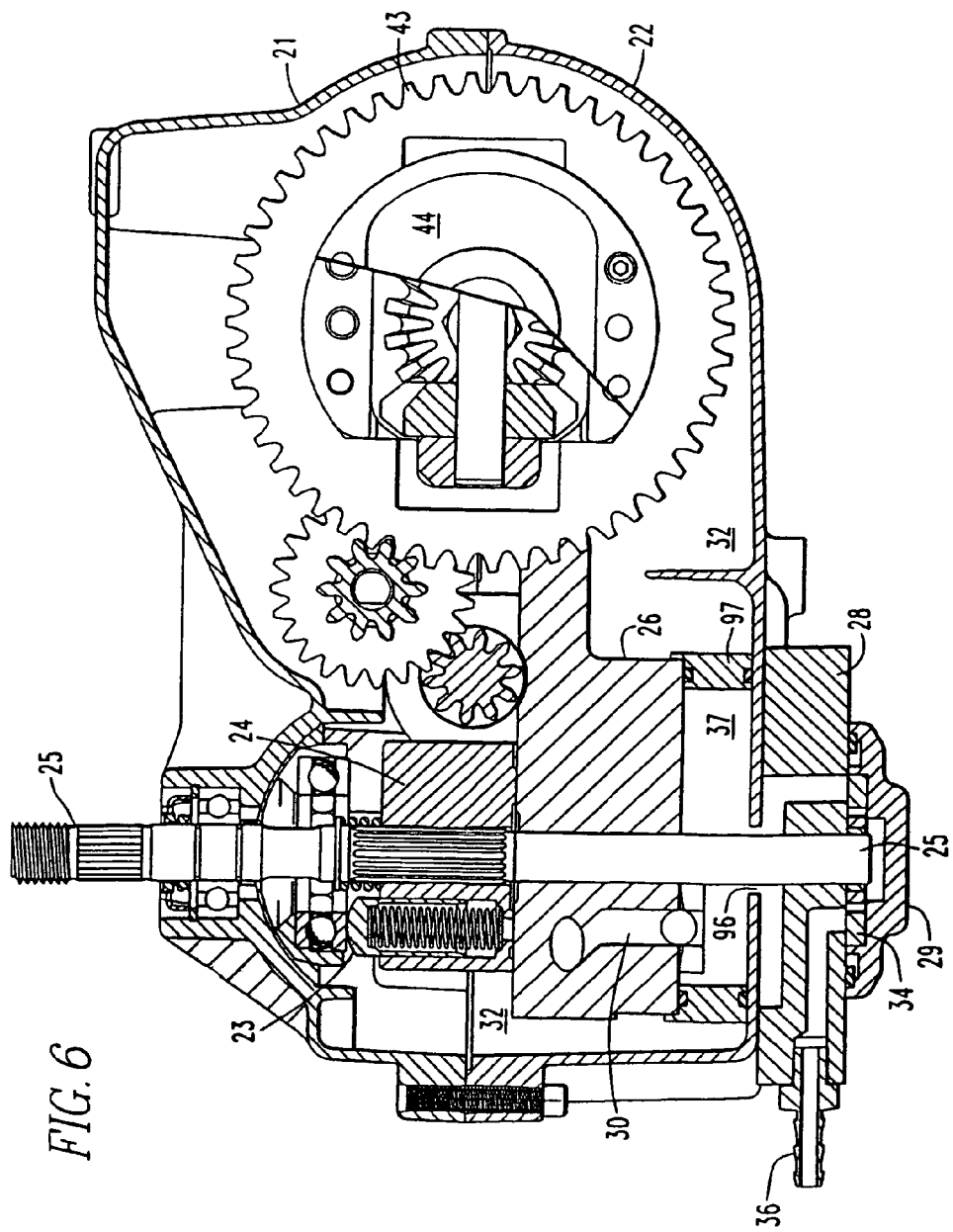
FIG. 6 is a sectional side view of another embodiment of an IHT in accordance with the present invention, with the center section enclosed in the housing and porting plate mounted to the exterior of the housing.

In an alternative embodiment shown in FIG. 6, center section 26 could be mounted entirely within the IHT housing and inlet porting plate 28 would then be mounted on the external surface of lower housing 22. The charge pump is then connected to internal porting 30 of center section 26 with a lower housing passage 96 and a gallery formed inside the lower housing by a gallery housing 97.

Figure 7:
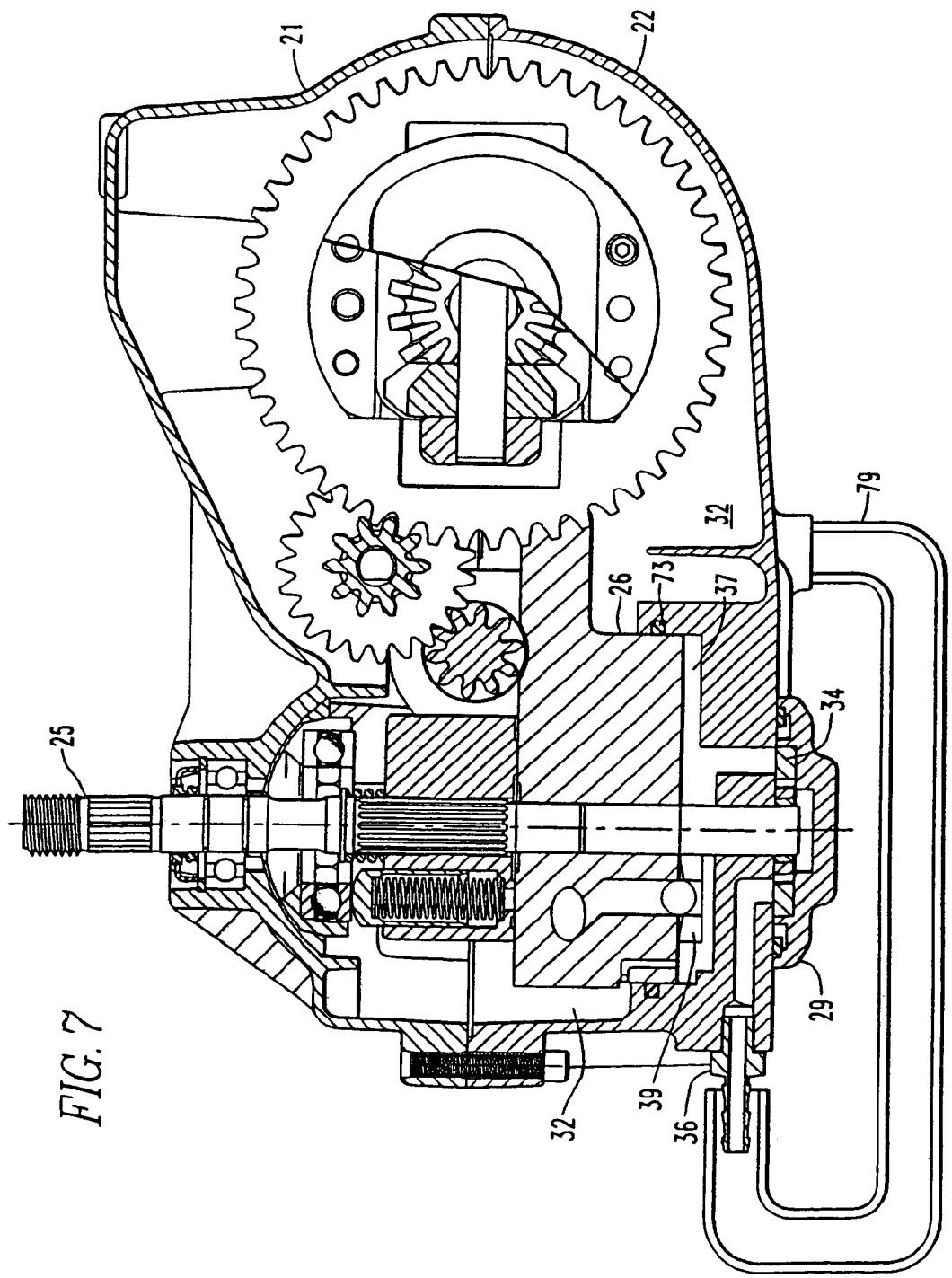
FIG. 7 is a sectional side view of another embodiment of an IHT in accordance with the present invention, with the porting plate incorporated as a part of the lower housing.
Figure 8:
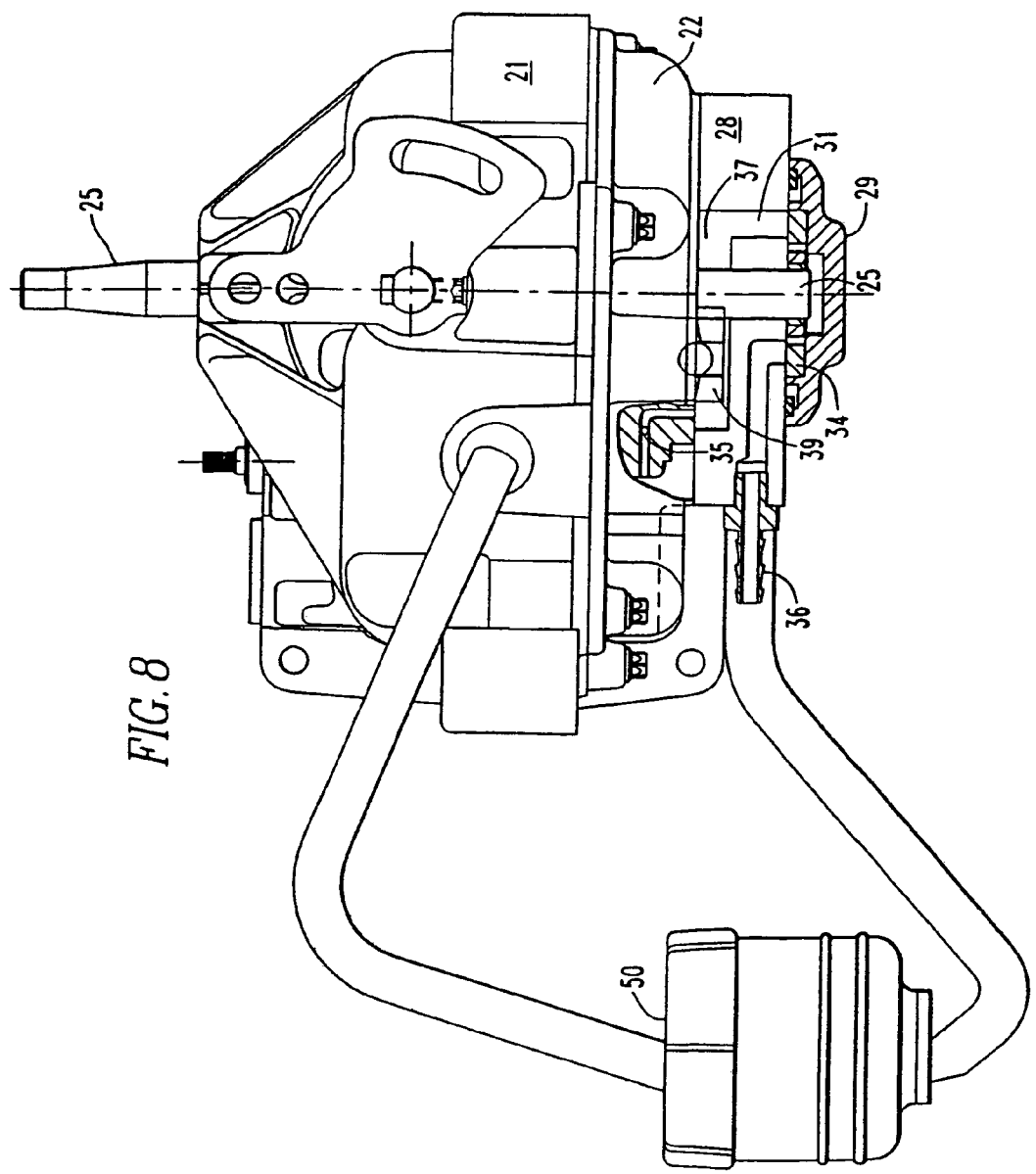
FIG. 8 is an elevational end view of an HST incorporating a charge pump in accordance with the present invention.

FIG. 7 shows another embodiment of this invention, similar to that shown in FIG. 6, wherein the porting plate has been integrally formed with the lower housing 22. Center section 26 is seated on internal surface 99 of lower housing 22. Gallery 37 for the hydraulic fluid is formed and defined by the lower surface of center section 26 and the internal surfaces of the integrally formed porting plate, i.e., lower housing 22. An o-ring 73 is used to aid in positioning and seating these elements and prevents leakage of hydraulic fluid from gallery 37. The principal benefit of this embodiment is the reduction in complexity by the elimination of a separate porting plate. In the embodiment shown in FIG. 1 o-ring 73 seals gallery 37 from the interface between porting plate 28 and lower housing 22 as well as from sump 32. With the integration of porting plate and lower housing 22 into a single piece, the requirement to seal between these two is eliminated, which thus increases the reliability of the IHT.

In the embodiment shown in FIGS. 1–5, check valves 39a and 39b are operatively connected to internal porting 30 of center section 26. As shown in this embodiment, check valves 39a and 39b may be included in plugs that are threaded directly into the surface of center section 26. Alternatively, they may be located in a separate plate that is then secured to center section 26.

The two check valves 39a and 39b each communicate with a different side of the internal hydraulic porting 30. As previously stated, the hydraulic circuit, including internal hydraulic porting 30, consists of a high pressure and a low pressure side, which are reversed when the vehicle direction, of motion is changed. Thus, while the HST is in the forward position, one side of the hydraulic circuit is under high pressure and the corresponding check valve is closed. At the same time the other side of the hydraulic circuit is under low pressure and that corresponding check valve is open and receives hydraulic fluid from gallery 37. When the HST is moved to reverse, the two sides switch and the formerly low pressure side is under high pressure and the corresponding check valve is now closed and the high pressure side is now under low pressure, closing that corresponding check valve.

When the HST is in the neutral position, there is no demand for make-up fluid. However, since the rotational speed of input shaft 25 does not vary, the fluid pressure supplied to gallery 37 from gerotor set 34 will remain constant, requiring fluid to be diverted back to sump 32 through relief passage 38 formed into center section 26. Relief valve 35, which may be located at any point in passage 38, controls the flow through passage 38. While the relief passage was selected to be through the center section in this embodiment of the invention, alternative passages can be formed through the porting plate 28 or through the housing 22; the locations of the relief passage in other than center section 26 are considered obvious variations of the invention. Also, relief valve 35 can be a variety of devices in configurations that are known in the art, and would remain in communication with passage 38 regardless of the location of that passage.

A charge pump embodiment of the invention incorporated in an HST will now be described in accordance with the accompanying drawings. As discussed above, another embodiment of this invention uses the charge pump in a stand-alone HST that is mounted within a housing separate from that of the components that transfer power from the HST to one or more axle shafts. In such an embodiment, the specifics of the charge pump and related structures shown in FIG. 3 can remain the same. FIGS. 8–11 show such a stand alone HST unit incorporating a charge pump embodiment of the invention. The general operation of the HST is identical to that described above and elements that are structurally identical to those described above are given identical numerals.

Figure 10:
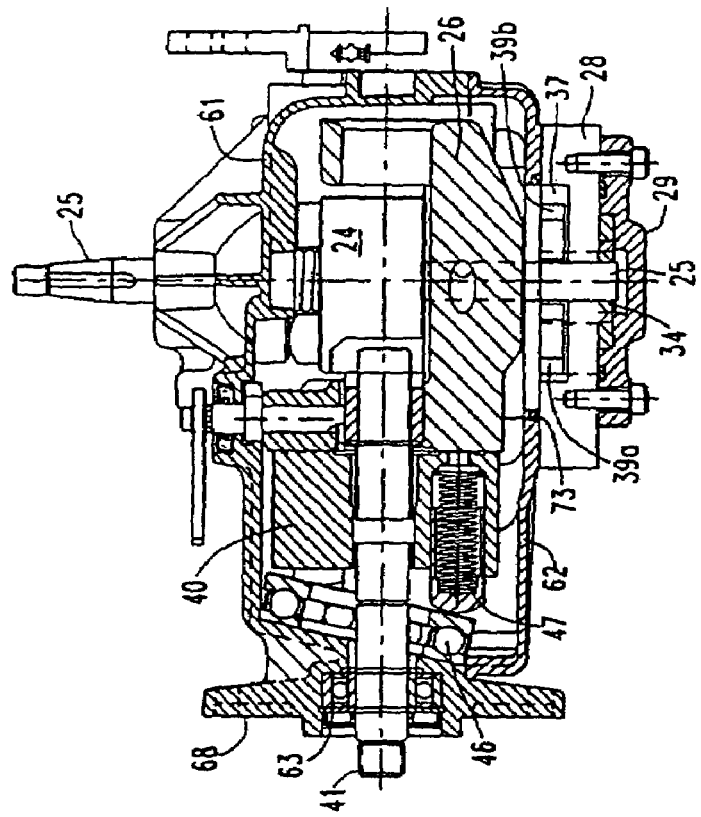
FIG. 10 is a sectional side view of the HST shown in FIG. 9 along the line 10—10.
Figure 9:
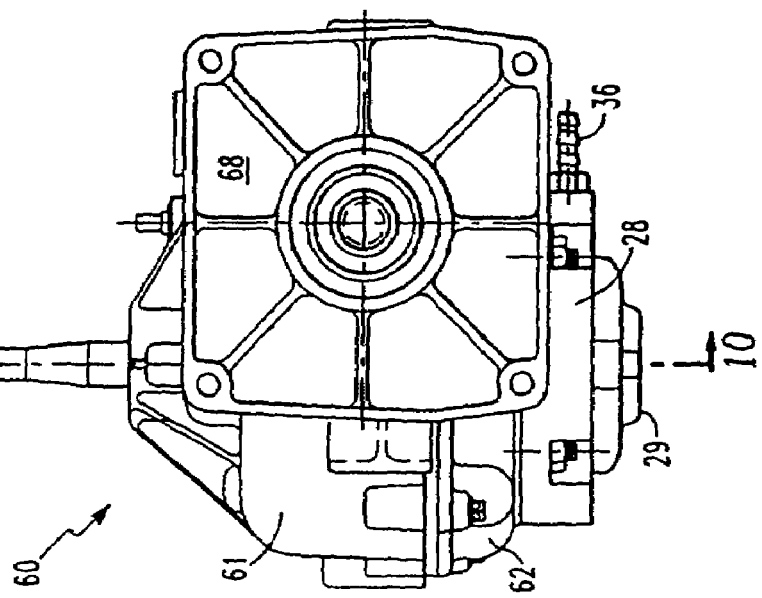
FIG. 9 is a further elevational end view of the HST shown in FIG. 8.
Figure 11:
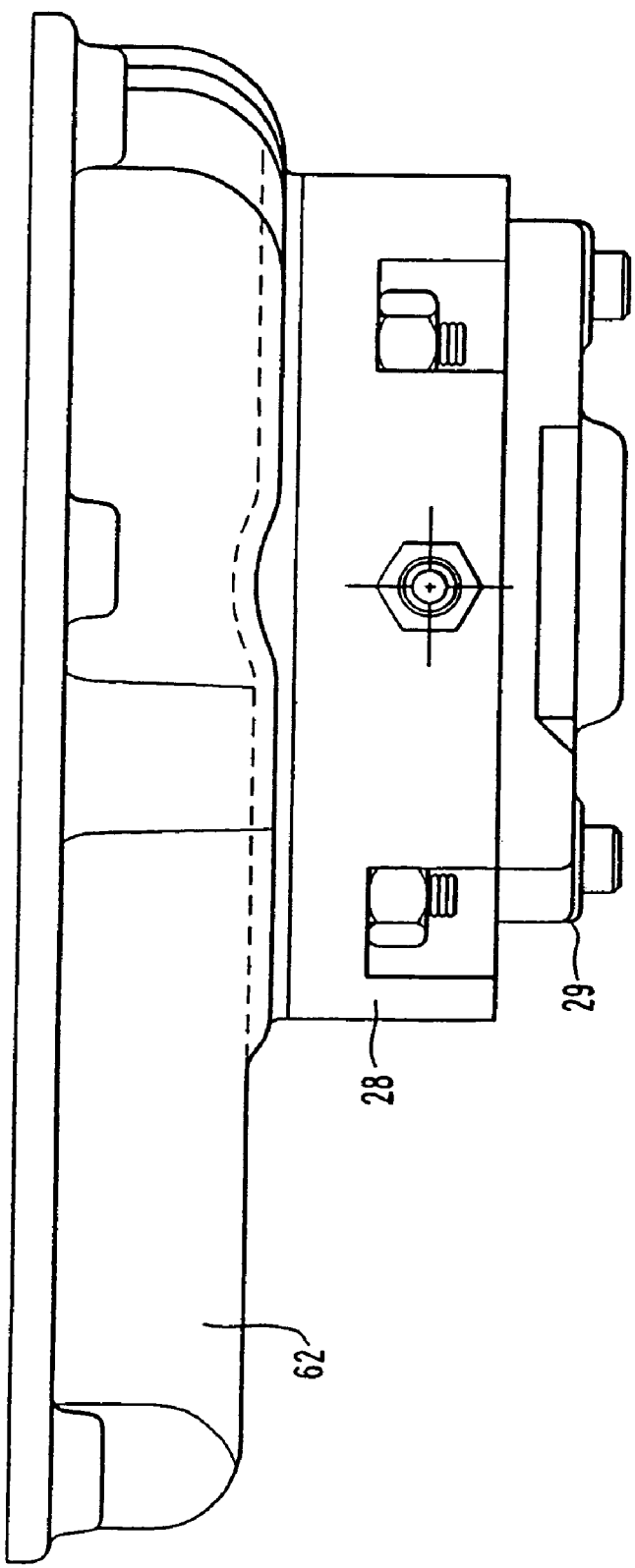
FIG. 11 is a partial elevational side view of the HST lower housing, porting plate and charge cover shown in FIG. 8.

As shown in FIGS. 9 and 10, HST 60 includes upper housing 61 and lower housing 62. In these figures, the rotation of motor 40 caused by action of the motor pistons 45 against fixed swashplate 46 drives output shaft 41. Output shaft 41 is supported by bearings 63, and extends through the transmission mounting plate 68 that is integrally formed with upper housing 61 so as to engage a separate axle driving apparatus (not shown).

As shown is FIG. 10, inlet 36 receives fluid from the housing for the axle driving apparatus to which the HST 60 is mounted. Fluid may also be received from a reservoir 50 that would be mounted to the support structure of the vehicle in which the HST and axle driving apparatus were attached. As in the IHT configuration, inlet 36 could also be in communication with sump 32 formed by the upper housing 61 and lower housing 62.

Figure 12:
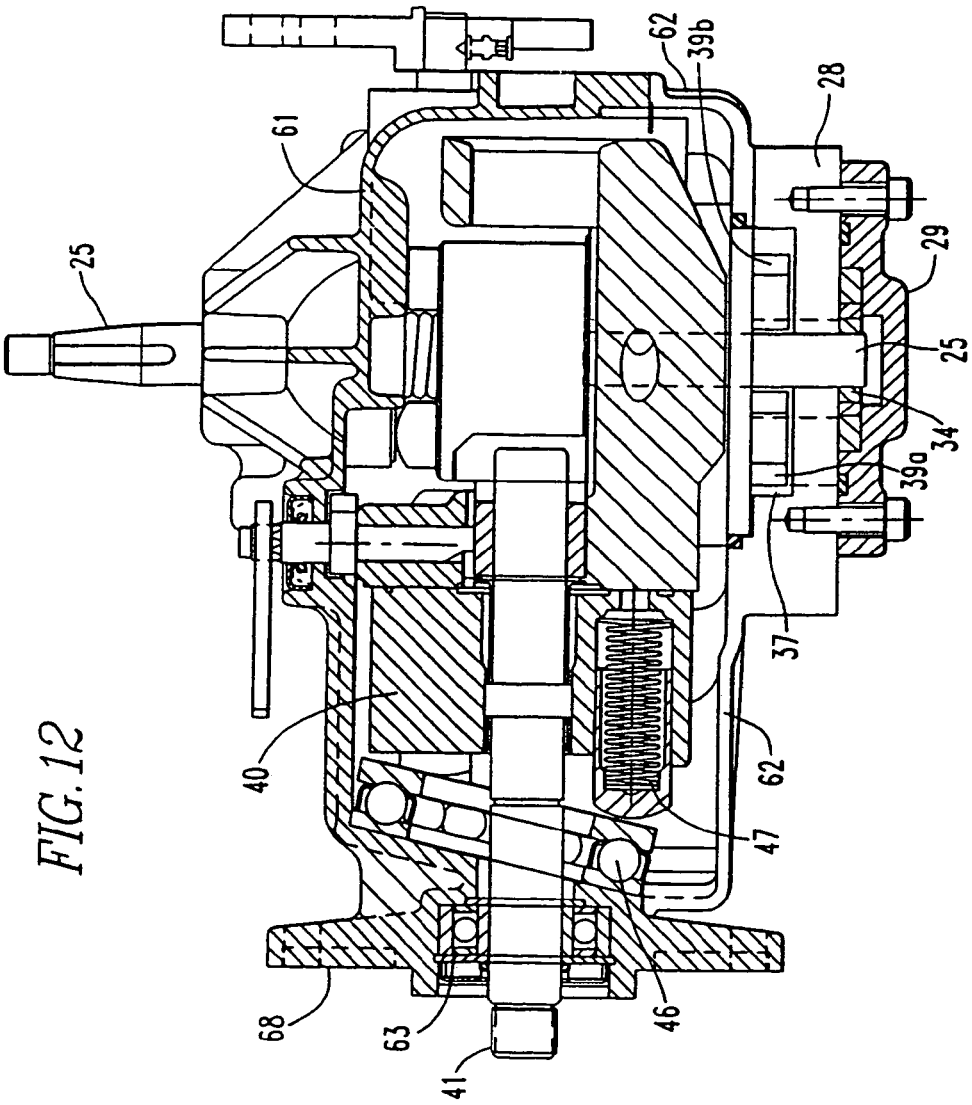
FIG. 12 is a sectional side view of another embodiment of an HST with a charge pump in accordance with the present invention incorporating the porting plate into the lower housing.
Figure 13:
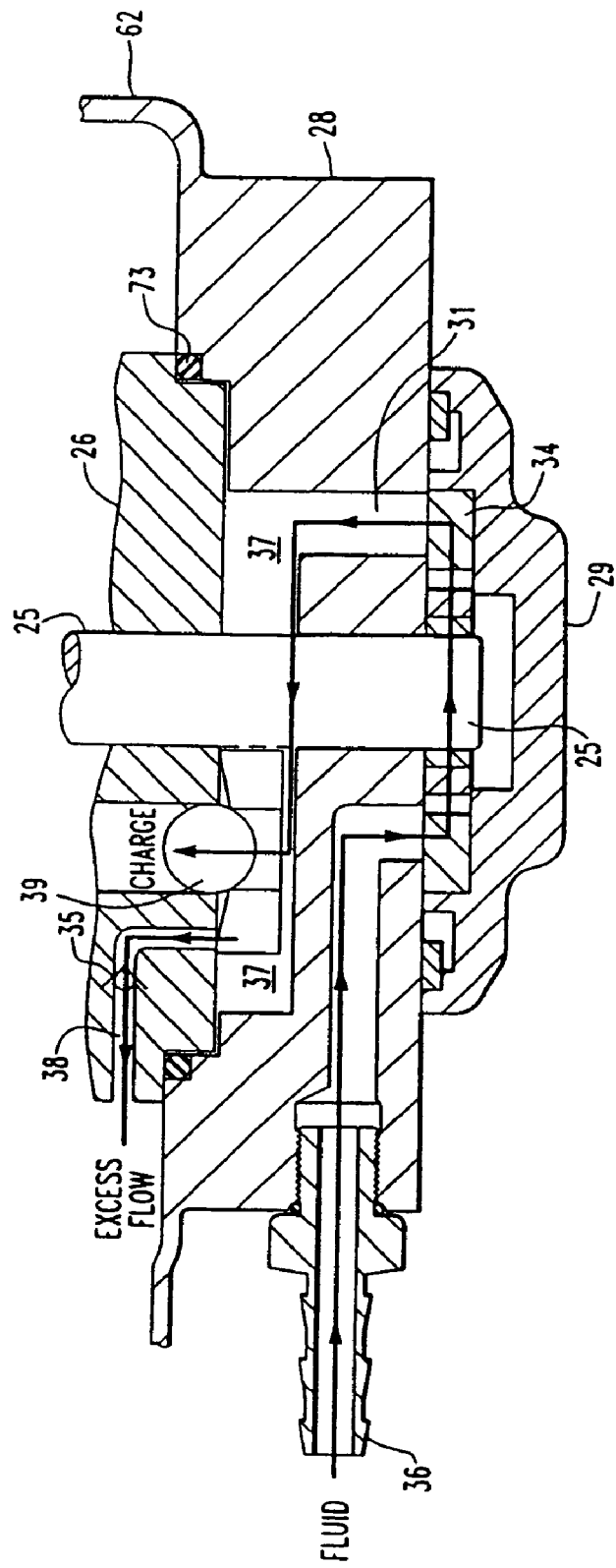
FIG. 13 is a partial, sectional side view of the lower housing of the embodiment shown in FIG. 12.

Another embodiment of the charge pump and lower housing is shown in FIGS. 12 and 13, wherein the inlet porting plate 28 is integrally formed with the lower housing 62, similar to the embodiment shown in FIG. 7. The explanation provided above for the IHT version of this embodiment is applicable for the HST. The same benefits that accrue to the IHT from this embodiment also accrue to the HST.

An auxiliary pump embodiment of the invention incorporated in an IHT or HST will be described in accordance with the accompanying drawings. A further embodiment encompasses the use of a pump that provides hydraulic fluid to power attachments and implements, known in the art as an auxiliary pump, in addition to the charge pump with an IHT or with a stand-alone HST that is mounted with a separate axle driving apparatus. Auxiliary pumps for use with HSTs are generally known in the art and are used to create hydraulic fluid flow to power attachments and implements such as a hydraulic mower deck lift. FIGS. 14 through 18 show an IHT 120 with a charge pump and auxiliary pump mounted thereon in accordance with this invention. The general operation of IHT 120 in this embodiment is substantially identical to that of the IHT depicted in FIGS. 1–5, and similar parts are indicated with the same numeral preceded by the numeral "1". For the sake of brevity, such parts will not be discussed herein except as such specifically relates to this 20 embodiment of the invention.

Figure 19:
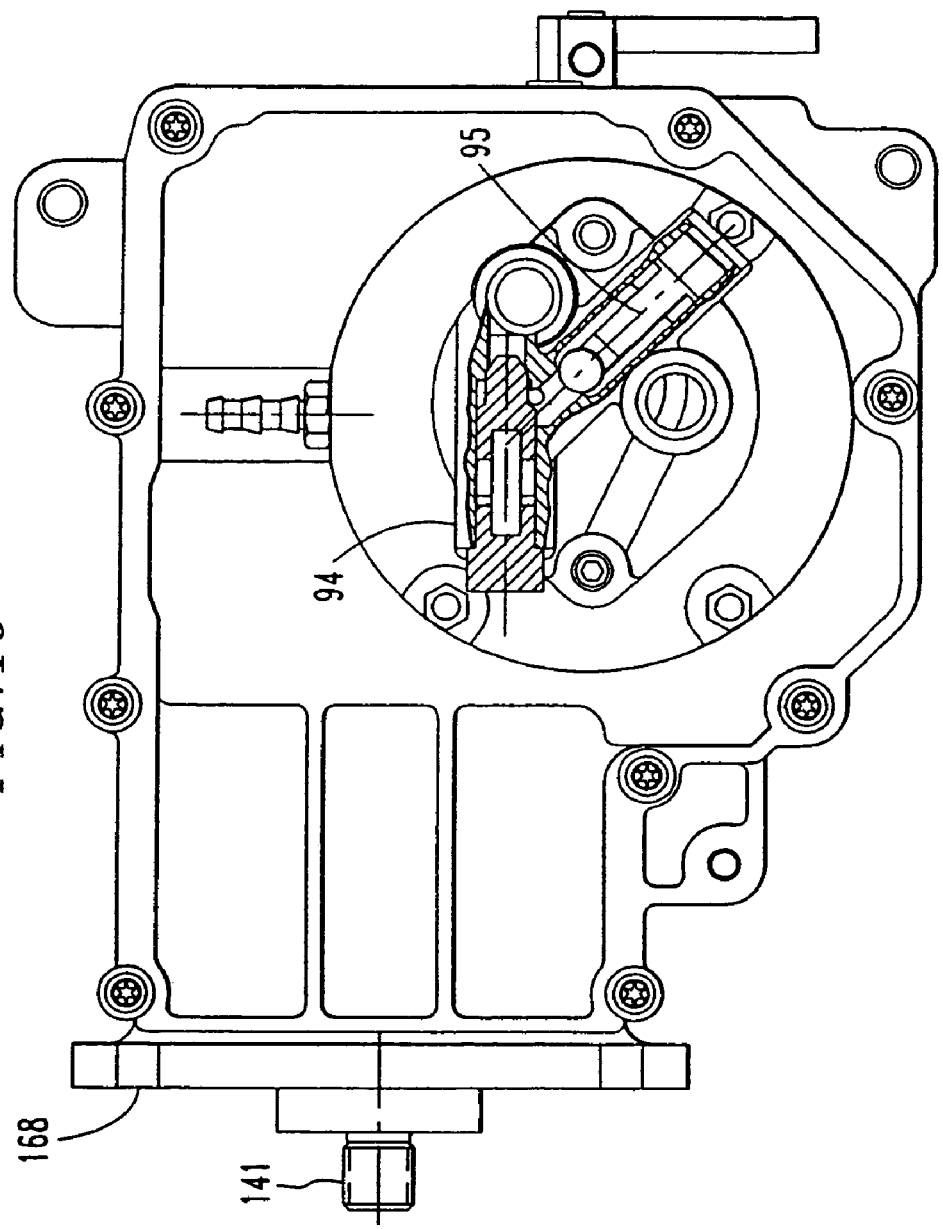
FIG. 19 is a bottom plan view of an HST incorporating an auxiliary and charge pump of the present invention, with a partial sectional view of the auxiliary pump cover.
Figure 20:
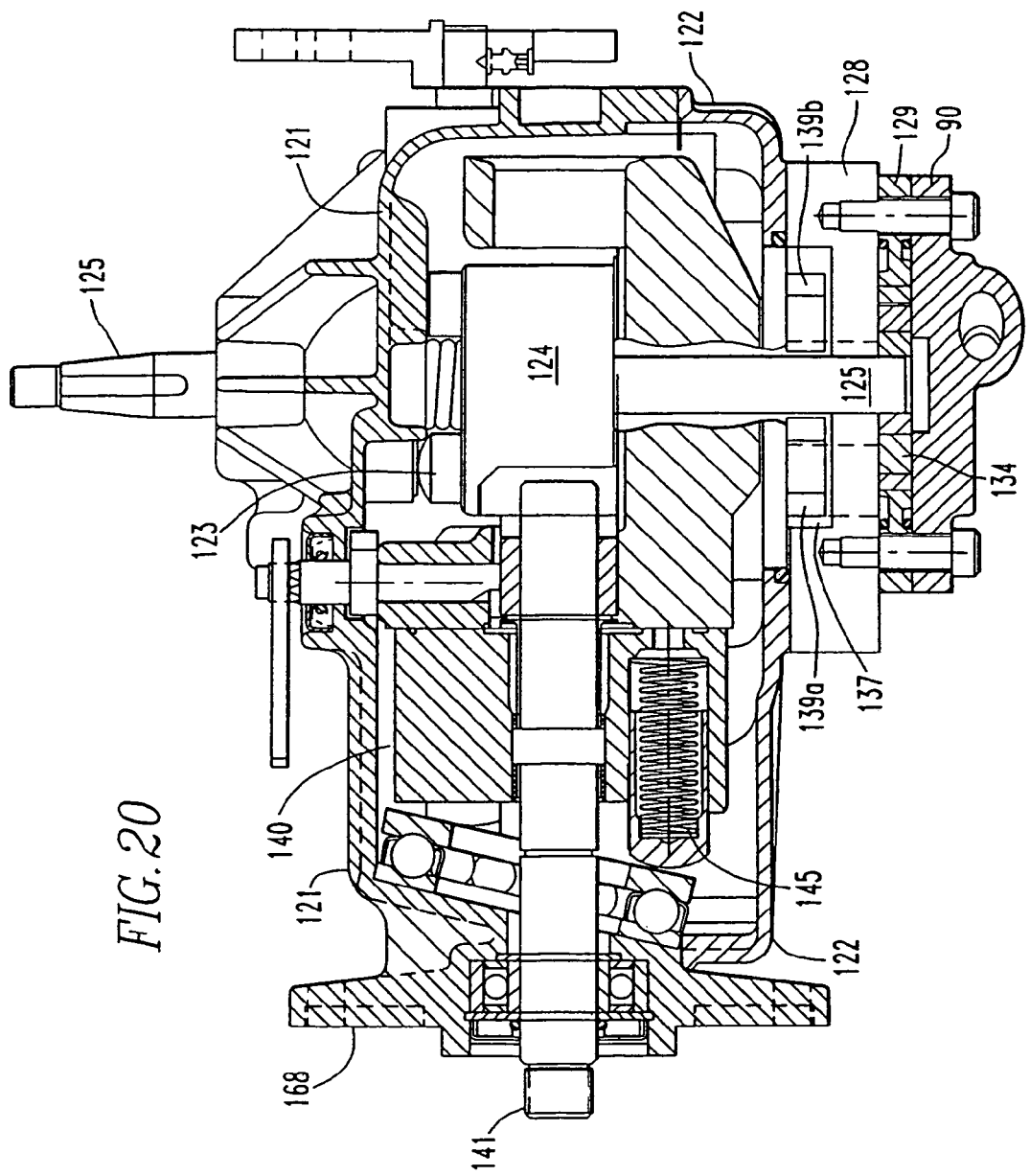
FIG. 20 is a sectional side view of an HST incorporating an auxiliary and charge pump embodiment of the present invention.

As discussed above, the auxiliary pump and charge pump combination disclosed herein can be used with an IHT, as shown in FIGS. 12–17, and can also be used with an HST as shown in FIGS. 19 and 20 that has its housing attached to a separate axle driving apparatus (not shown). The general operation of the auxiliary pump and charge pump in FIGS. 19 and 20 is identical to that shown in FIGS. 12–17 and the following discussion is applicable to both applications of this embodiment. The mounting of the HST housing through transmission mounting plate 168 is the same as was described for FIG. 10 above.

Figure 14:
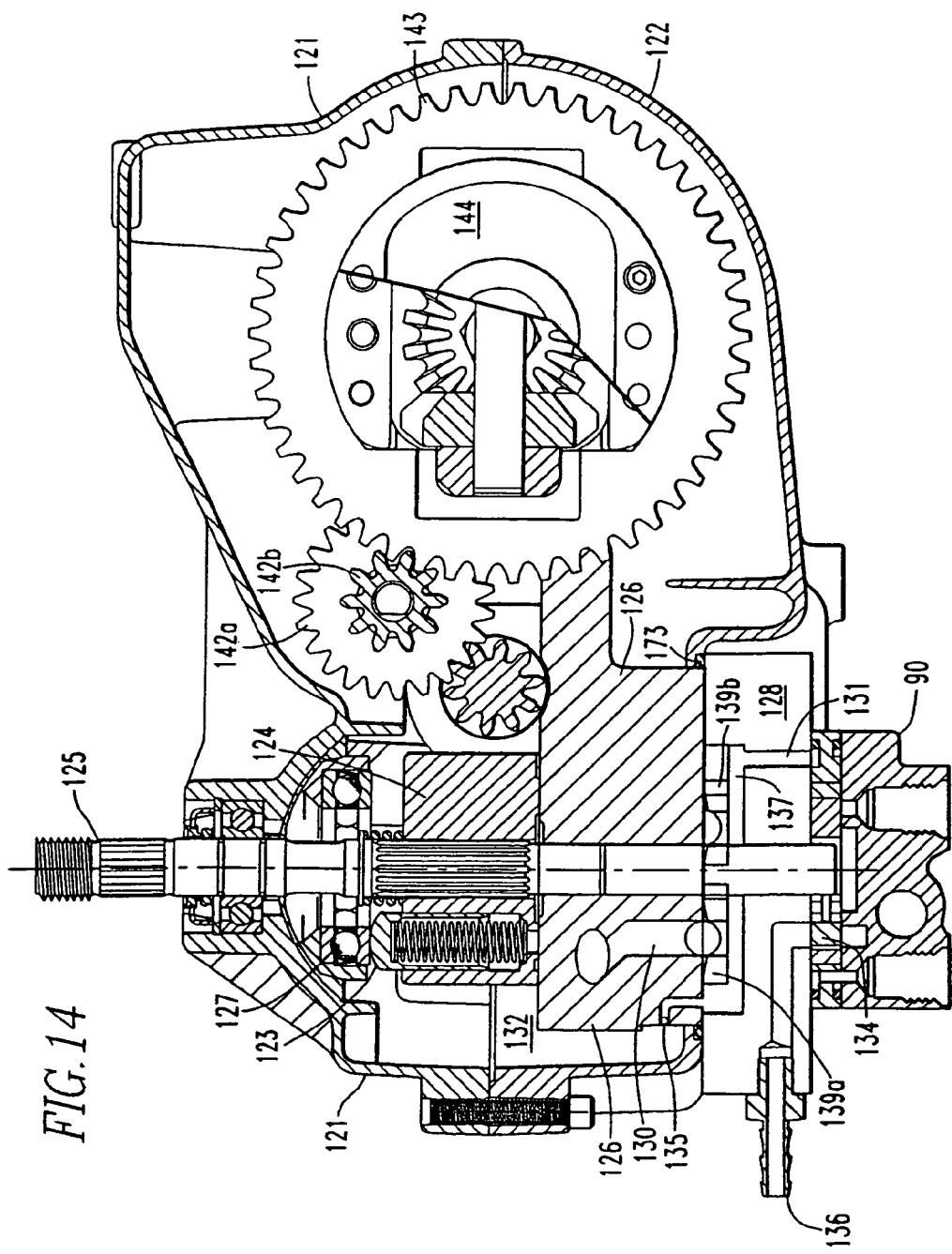
FIG. 14 is a sectional side view of an IHT incorporating an auxiliary pump in accordance with another embodiment of the present invention.
Figure 15:
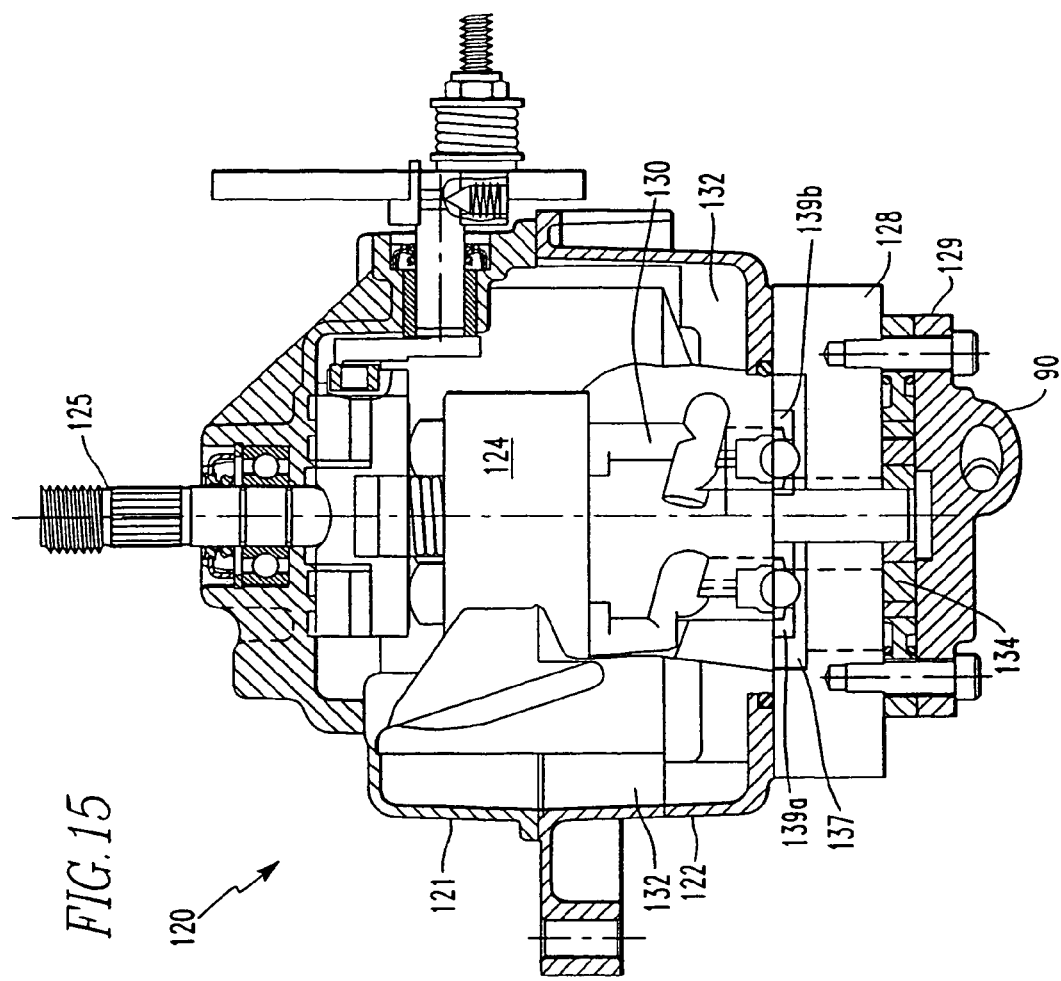
FIG. 15 is a sectional end view of the IHT shown in FIG. 14.
Figure 16:
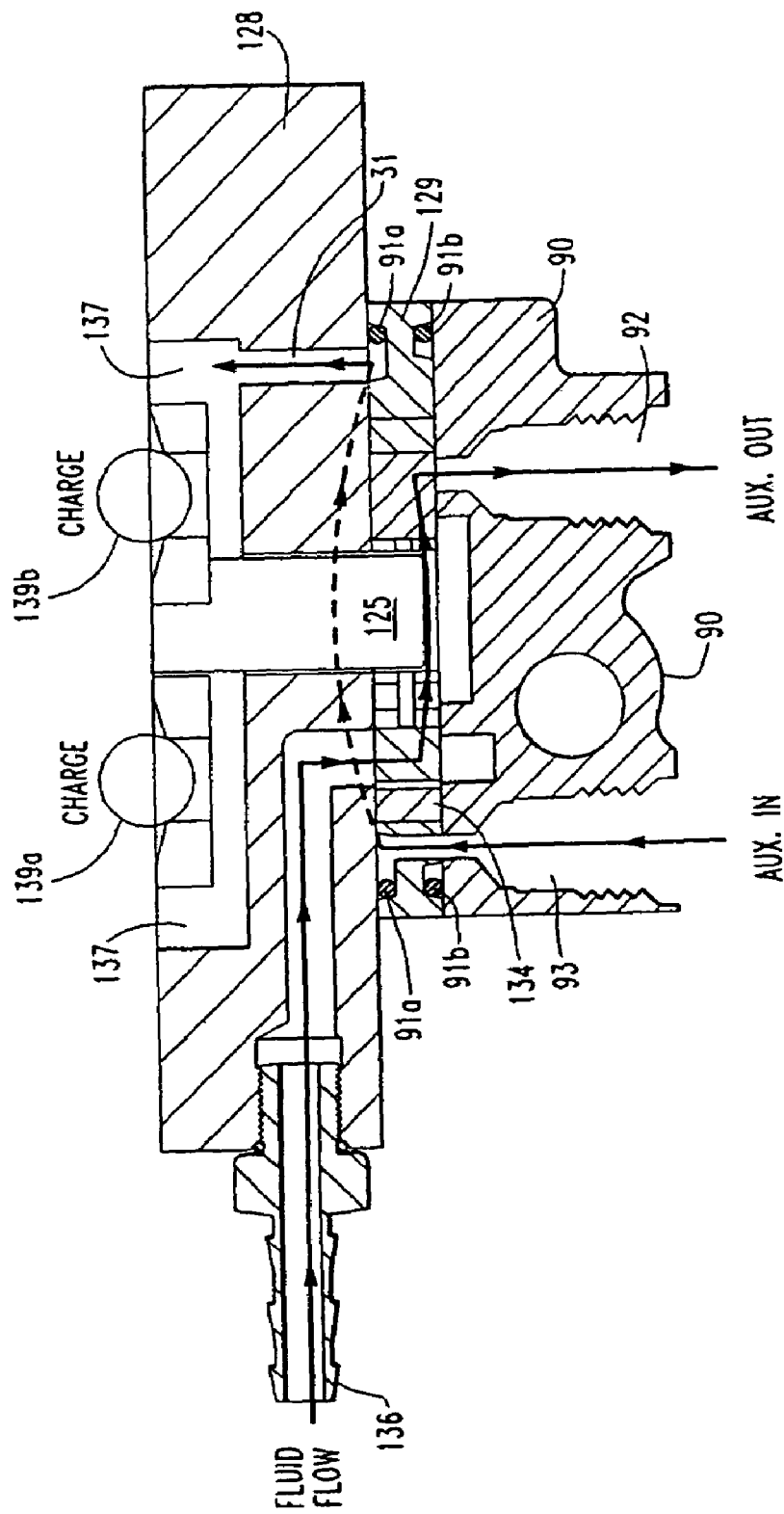
FIG. 16 is a sectional side view of the auxiliary pump used in connection with the IHT shown in FIG. 14 with a typical fluid path shown.

As shown in FIG. 14, center section 126 is attached to upper housing 121 such that the lower surface is generally at the same level as the external surface of lower housing 122. The center section 126 may be but need not be attached to the surface of lower housing 122 in this embodiment, but is positioned by the hole in the lower housing 122 through which the center section 126 extends. Inlet porting plate 128 is attached directly to lower housing 122. Center section 126 includes two check valves 138 that, as per the preceding discussion, may be directly pressed into the bottom of the center section or which may be incorporated in a separate plate. Gerotor housing 129 is mounted to porting plate 128 and houses gerotor set 134. Auxiliary pump cover 90 is then mounted to gerotor housing 129. O-rings 91a and 91b are used to prevent leakage of hydraulic fluid from the gerotor housing 129.

Rotation of gerotor set 134 created by rotation of input shaft 125 creates a suction at inlet 136. The hydraulic fluid drawn into gerotor set 134 is then forced into auxiliary outlet passage 92 under pressure to an implement circuit. The implement circuit returns hydraulic fluid via the auxiliary inlet passage 93, and then into gerotor housing 129. The gerotor housing provides a path for the hydraulic fluid that is connected to fluid passage 131 in the porting plate, and thus to gallery 137. The path that returns fluid from the implement circuit is not critical, and may be implemented in a variety of configurations that are well known in the art. The direction of fluid flow is generally shown by the arrows in FIG. 16.

Figure 17:
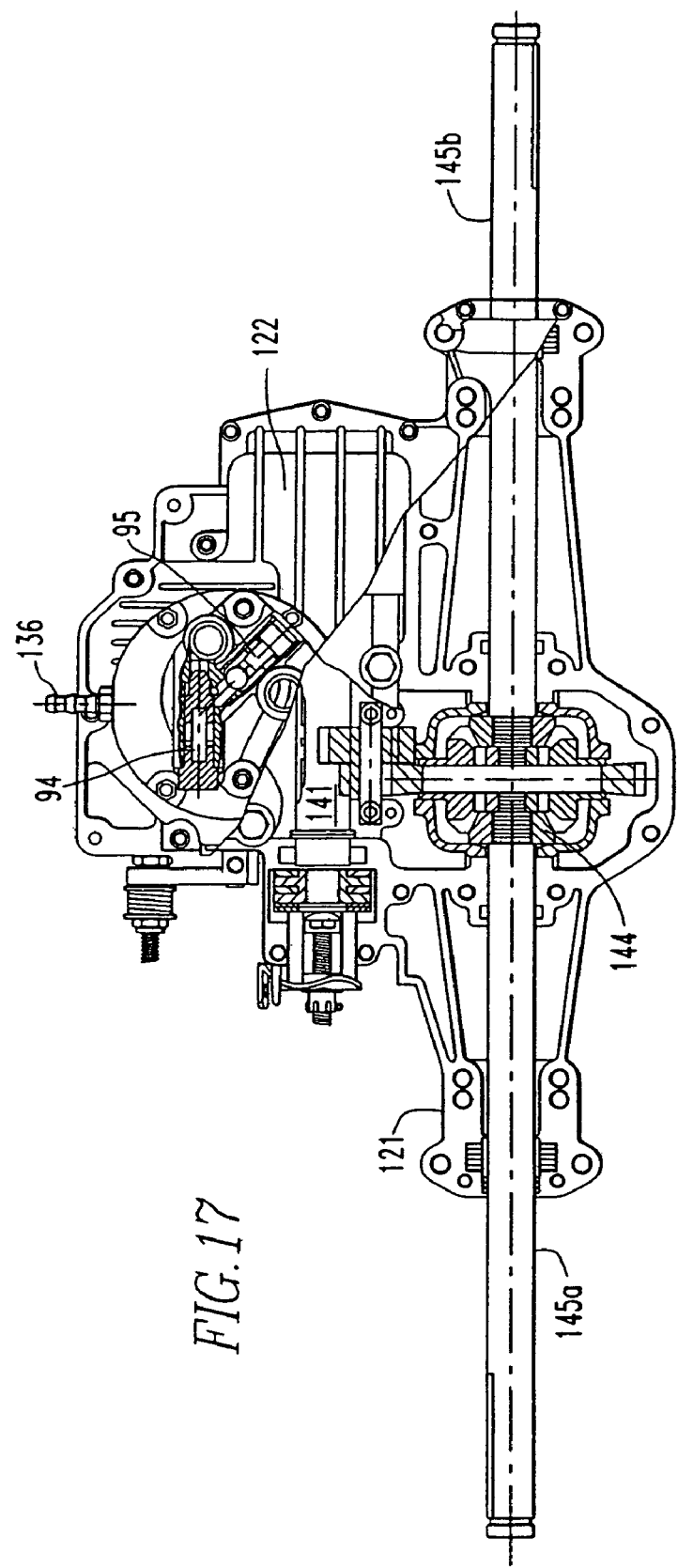
FIG. 17 is a partial sectional bottom plan view of an IHT as shown in FIG. 14, with the lower housing, porting plate and auxiliary pump cover partially cut away.
Figure 18:
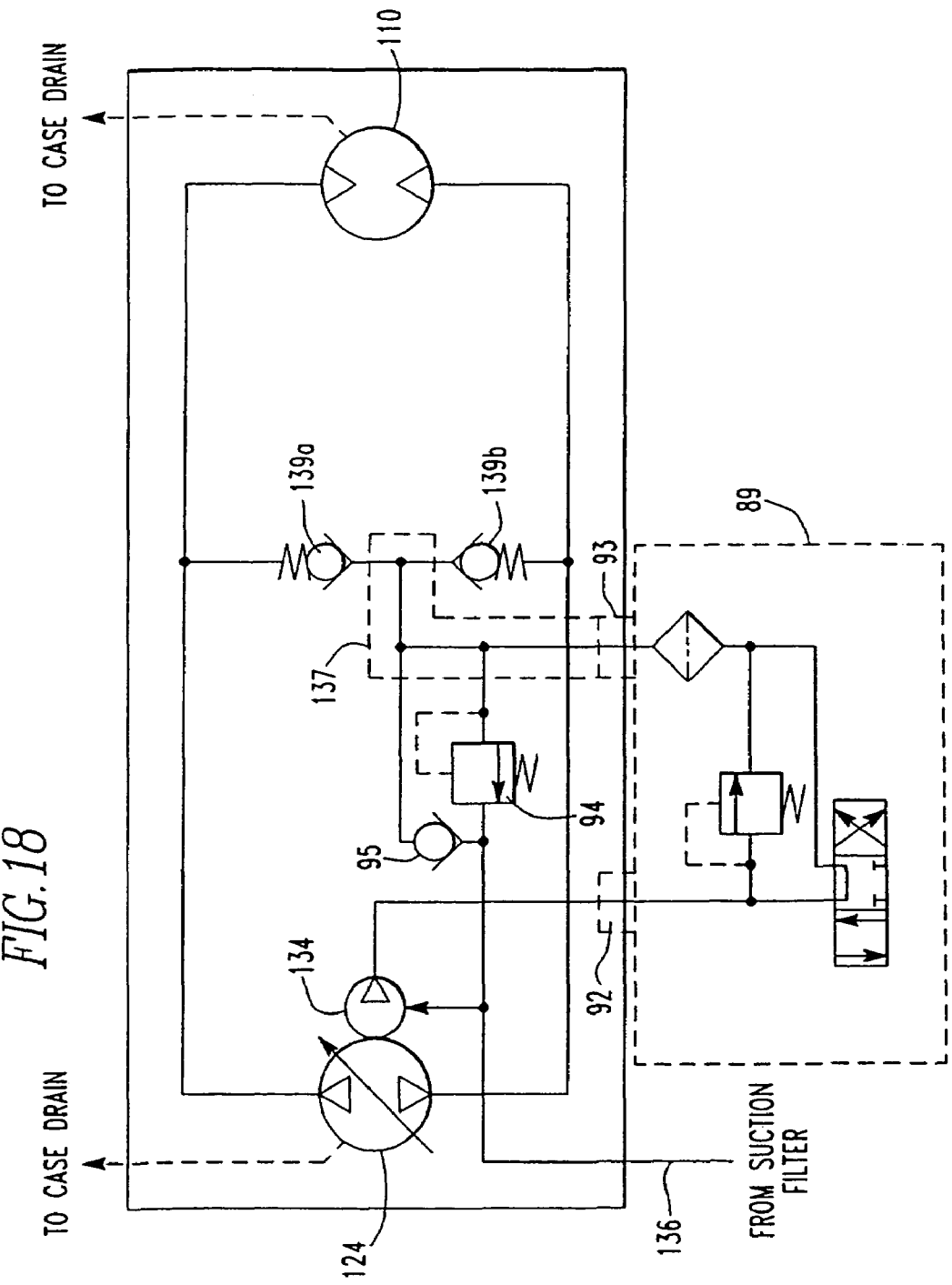
FIG. 18 is a hydraulic schematic of the embodiment as shown in FIG. 14.

As shown in FIG. 17, auxiliary pump cover 90 also includes a charge relief valve 94 and a check valve 95. These valves can be implemented in a variety of configurations that are well known in the art, and are not unique to this invention. As the FIG. 17 hydraulic schematic indicates, charge relief 94 acts to maintain hydraulic pressure in gallery 137. Excess fluid not demanded by check valves 139a and 139b is diverted through charge relief valve 94 and returned to gerotor set 134, where it is again routed through auxiliary outlet passage to the implement circuit 89. If either the motor or pump requires more hydraulic fluid than is available through implement circuit 89, then the suction caused in gallery 137 when either check valve 139a and 139b opens will cause check valve 95 to open to provide the additional hydraulic fluid required.

Figure 21:
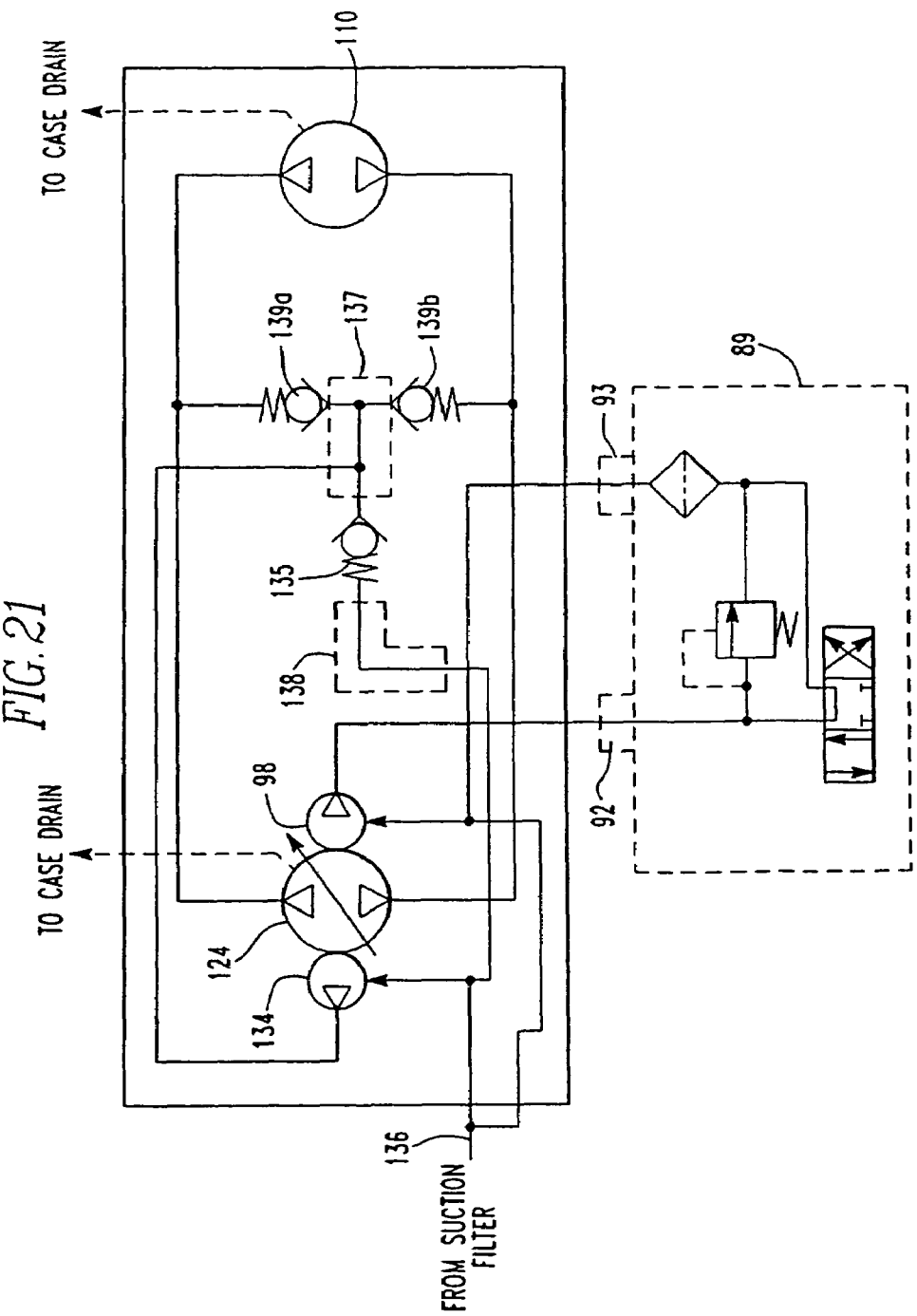
FIG. 21 is a hydraulic schematic of an embodiment that incorporates separate charge and auxiliary pumps.
Figure 22:
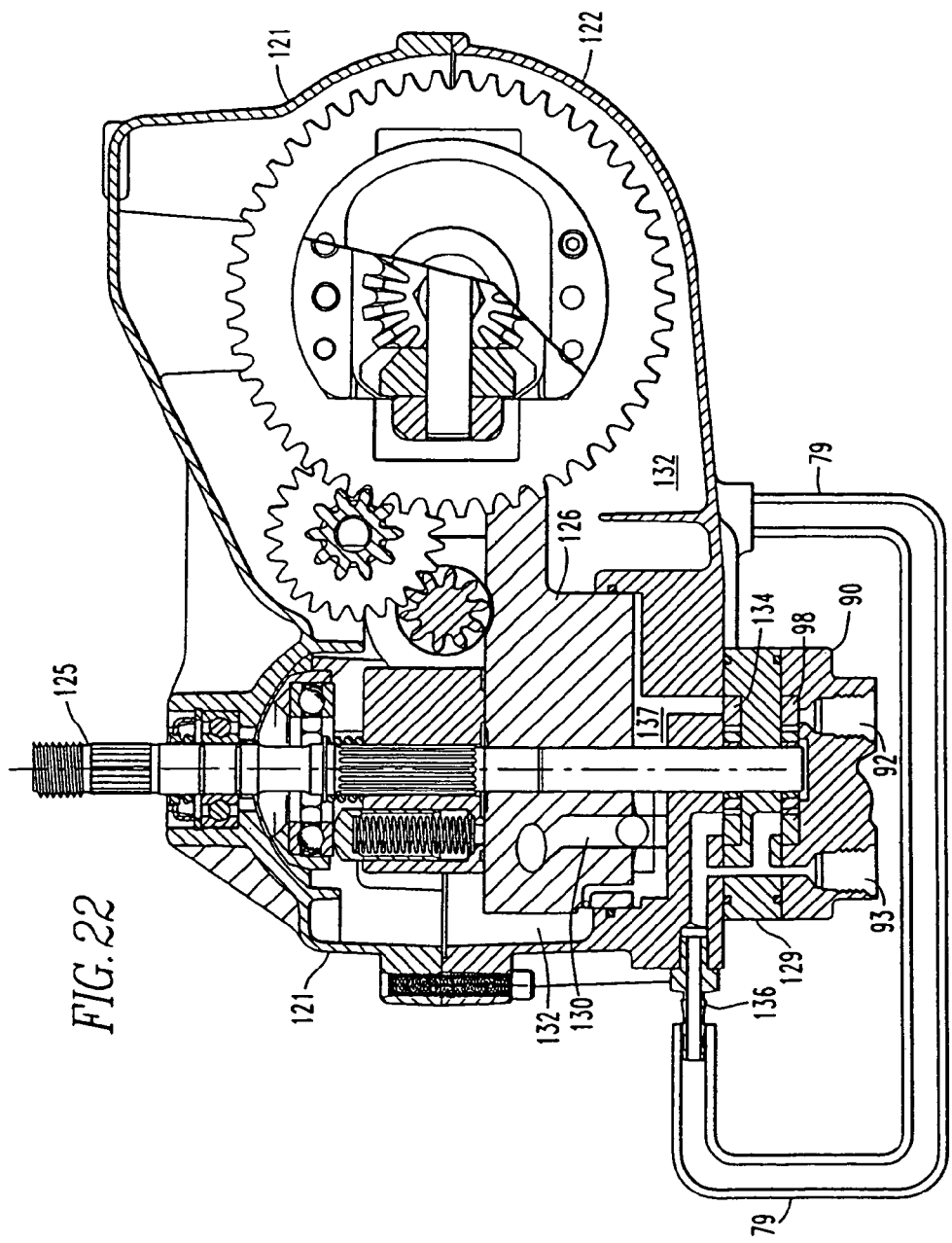
FIG. 22 is a sectional side view of a further embodiment of an IHT incorporating separate charge and auxiliary pumps.

Another embodiment shown in FIGS. 21–22 uses two completely separate gerotor sets 98 and 134 to serve as auxiliary and charge pumps, respectively. In this embodiment, the charge and auxiliary circuits are independent of each other, as shown in the hydraulic schematic in FIG. 21. An implementation of this embodiment is shown in FIG. 22, where input shaft 25 has been lengthened to extend through a modified charge cover 129, into the auxiliary pump 98. The operation of this embodiment follows the description above until return to the auxiliary cover 90, where flow is directed back into the line that leads to reservoir 50 or sump 132. The operation of the charge pump circuit follows the description provided in the charge pump section above.

Turning now to FIGS. 23–26, there is illustrated two further embodiments of the present invention. In particular, both of these embodiments include a charge pump, comprising a gerotor 34 and gerotor housing 29, which is externally mounted to a lower housing cap 200. The lower housing cap 200 is, in turn, mounted over an opening in a housing section 202. As described previously, the gerotor 34 is drivingly engaged to the pump shaft 25 for creating a quantity of high pressure hydraulic fluid. The high pressure hydraulic fluid is stored in the gallery 37, which is disposed in an area between the center section 26 and the charge pump, for use in the hydraulic pump and motor circuit as needed.

More specifically, the gallery 37 is defined by a manifold 204 which is cooperably positioned between the center section 26 and the housing cap 200 such that the upper surface of the manifold 204 matingly engages the center section 26, opposite its pump running surface, while the lower surface of the manifold 204 engages the interior surface of the housing cap 200. Preferably, the manifold 204 is constructed from a generally resilient and high pressure and heat resistant material, such as molded plastic or the like, to allow the manifold 204 to be compressionally captured between the center section 26 and the housing cap 200. To provide further structural integrity to the manifold 204, the manifold 204 may be provided with a series of strengthening ribs. The compressional capturing of the manifold 204 between the center section 26 and the housing cap 200 is desirable as it functions to minimize leakage from the gallery 37. To further assist in preventing leakage of the high pressure fluid as it flows from the charge pump to the gallery, an optional O-ring 205 may be positioned between the manifold 204 and the housing cap 200 which O-ring 205 seals the fluid flow path therebetween.

Also preferably supported between the center section 26 and 10 the housing cap 200 is an oil filter 206 which surrounds the manifold 204. While not required in the preferred embodiment the upper portion of the oil filter housing includes an extension 207 which is trapable between the manifold 204 and the center section 26 when the manifold 204 is secured hereagainst. This cooperation between the housing extension 207, center section 26, and manifold 204 functions to further secure the oil filter 206 in its desired position. A pair of optional O-rings 208, 210 are also preferably positioned between the oil filter housing and the center section 26 and housing cap 200, respectively, to prevent the flow of hydraulic fluid therebetween.

In a preferred embodiment of the invention, the manifold 204 is constructed to have a first generally circular upper portion 204a and a second generally circular lower portion 204b of smaller diameter. It is to be understood that this configuration, of the manifold 204 is not meant to be limiting and that the manifold 204 may be provided with other geometric arrangements while maintaining its ability to form the gallery 37. Nevertheless, the circular configuration provided to the upper portion 204a is desirable as it is more economical to machine the portion of the center section which preferably mates with the manifold 204 to prevent the side to side motion thereof as a circle. Additionally, the differing diameters of the upper portion 204a and the lower portion 204b is preferred as it creates a storage area for unpressurized, filtered fluid which area is in fluid flow communication with the charge pump.

During operation, filtered hydraulic fluid will be drawn into the charge pump through an inlet hydraulic passage 212 formed in the lower housing 200. The resulting pressurized hydraulic fluid, created by the action of the charge pump, will be forced into the gallery 37 through an outlet hydraulic passage 214 formed in the lower housing 200 and an opening 216 formed in the manifold 204. Check valves 39a, 39b mounted within the center section 26, operatively connect the gallery 37 and the high pressure hydraulic fluid stored therein with the hydraulic porting formed within the center section 26.

A charge relief valve 35 may optionally be provided to allow pressurized hydraulic fluid to be dumped from the gallery 37. In particular, the charge relief valve 35 may be maintained in the manifold 204 (FIGS. 23–25), in the center section 26 (FIG. 26), in the housing cap 200, or in the charge cover 29 (not shown). When the charge relief valve 35 is maintained in the manifold 204, it is preferred that the valve body 218 be formed integrally with manifold 204 itself, thus obtaining a valve body 218 at no additional cost within the manifold 204. This embodiment is particularly desirable since the elimination of the valve body also reduces the number or parts and simplifies the assembly process to the point where such assembly can occur at an original equipment manufacturer. Specifically, the component parts constituting the valve function are inserted into this body and retained therein by a retaining ring or like type of securing device. Similarly, when the charge relief valve 35 is maintained in the center section 26, it is preferred that the center section 26 itself be used as the valve body. This embodiment retains the advantages above-described but at a slightly higher cost owing to the need to machine the center section 26 to achieve the features required to maintain the charge relief valve 35 therein.

Should the charge relief valve 35 not be utilized, it is preferred that a fixed diameter bleed orifice be formed through the manifold 204. Specifically, the manifold 204 may be provided with an aperture of predetermined size which will allow the pressurized hydraulic fluid to be dumped from the gallery 37 at a rate dependent upon the viscosity thereof. Alternatively, while not preferred, the manifold 204 could be captured between the center section and the charge pump with an imperfect seal whereby the pressurized hydraulic fluid may escape from the gallery 37 therethrough.

Figure 23:
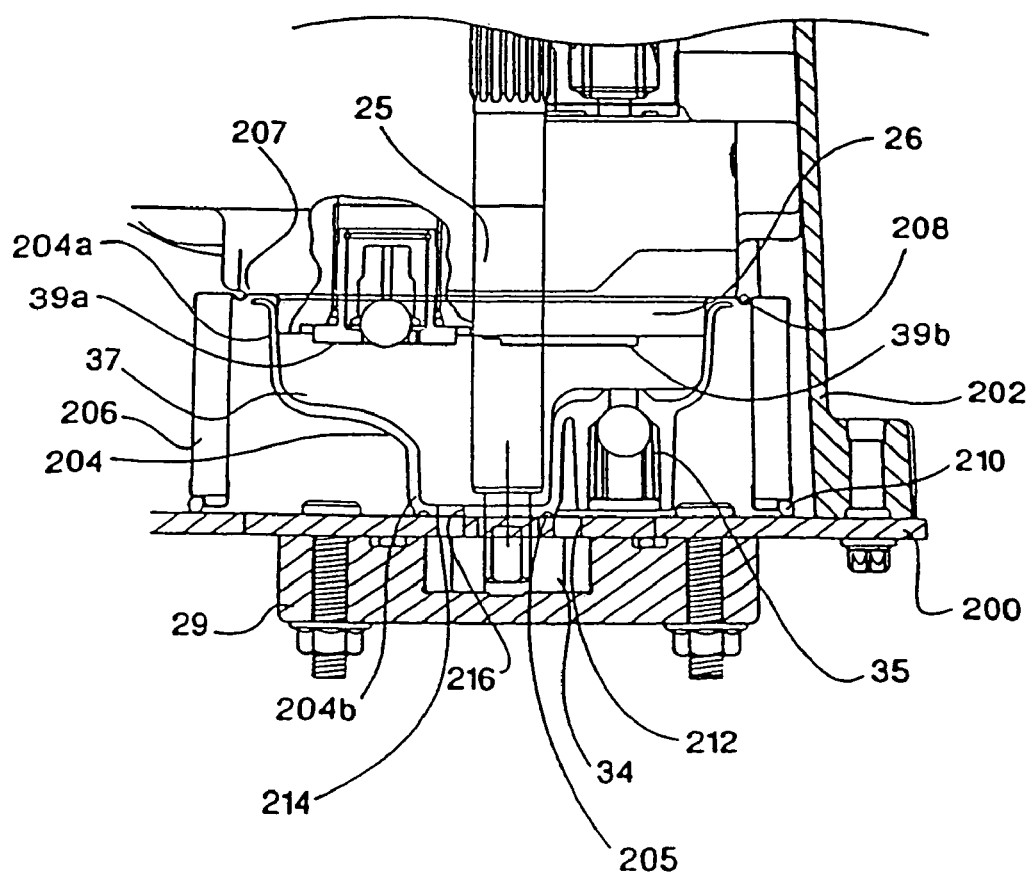
FIG. 23 is a sectional side view of a further embodiment of the invention incorporating a gallery forming manifold.
Figure 24:
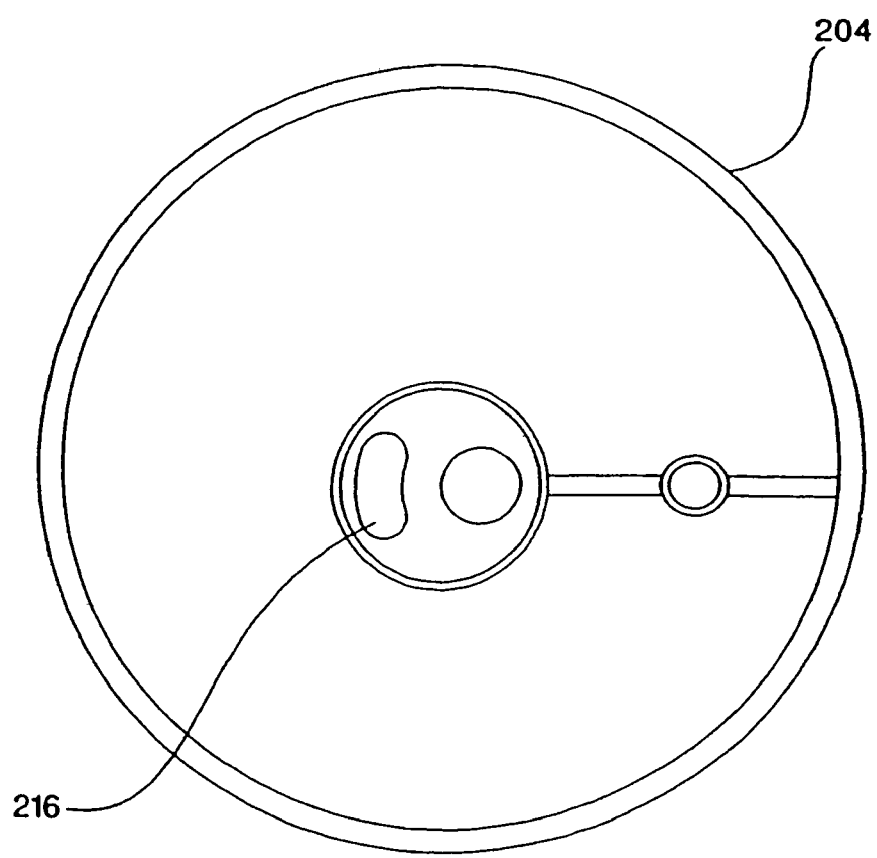
FIG. 24 is a top view of the manifold shown in FIG. 23.
Figure 25:
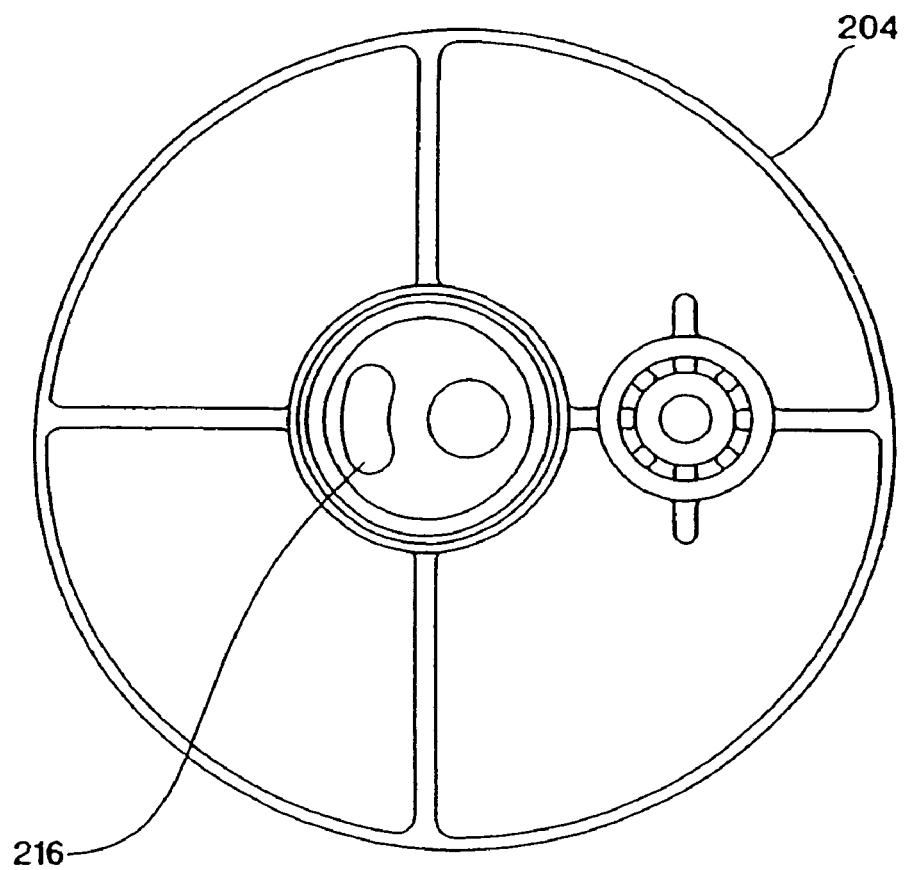
FIG. 25 is a bottom view of the manifold shown in FIG. 23.
Figure 26:
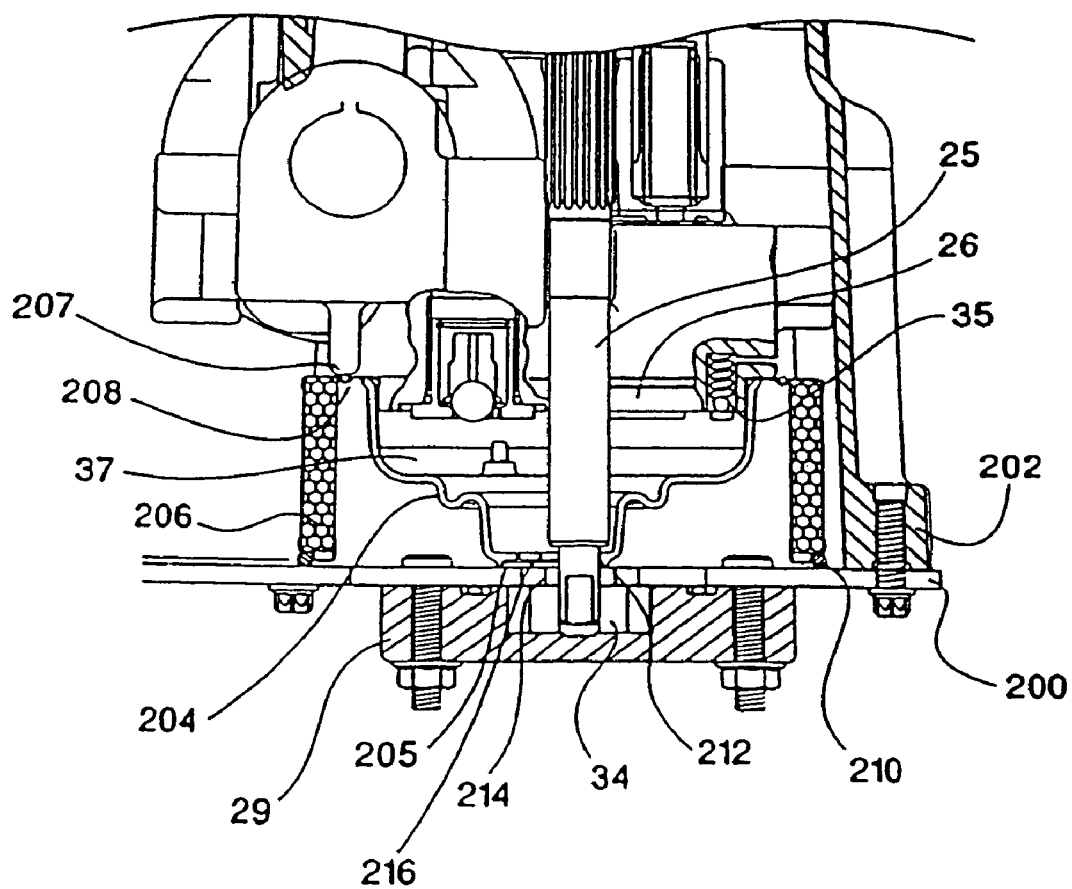
FIG. 26 is a sectional side view of a further embodiment of the invention incorporating a gallery forming manifold.
Figure 27:
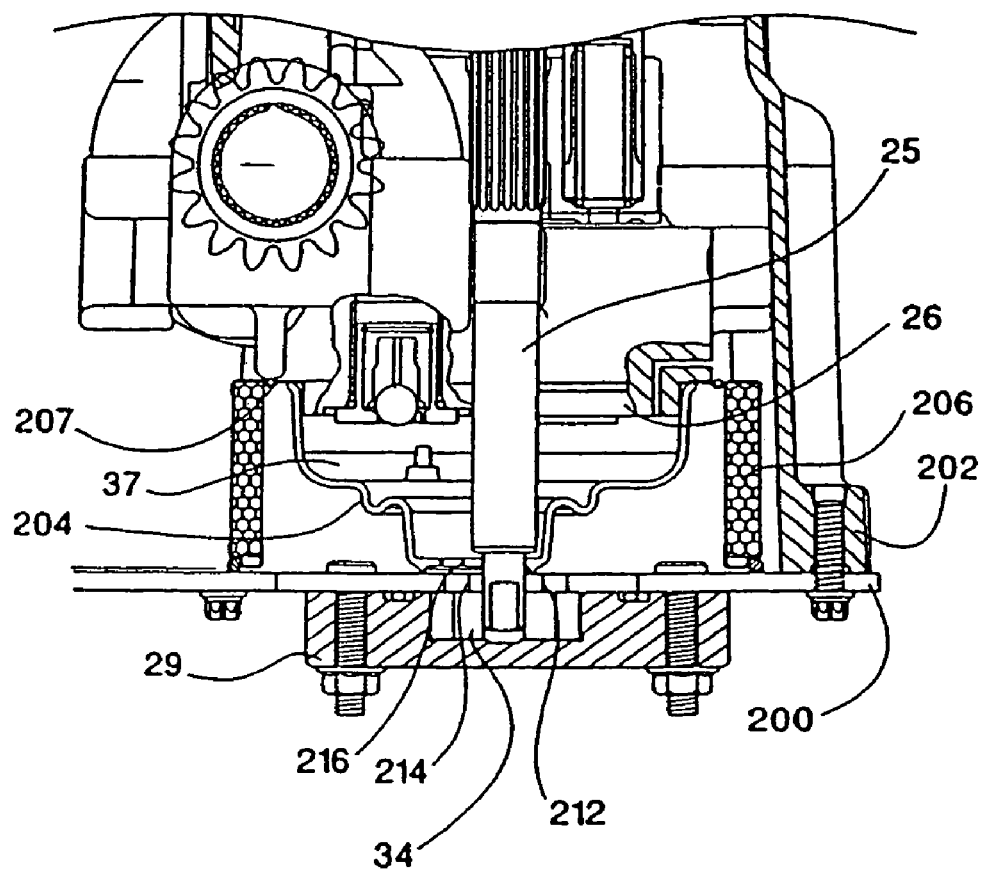
FIG. 27 is a sectional side view of a further embodiment of the invention incorporating a gallery forming manifold.

While the embodiments of the invention illustrated in FIGS. 23 and 26 have been shown with an externally mounted charge pump, it is also contemplated that the charge pump could be internally mounted within the housing without departing from the spirit of the invention. Accordingly, in a further embodiment, it is contemplated that the charge pump could be mounted to the internal surface of the housing cap with the manifold being cooperably disposed between the center section and charge pump cover.

It is to be understood that the above description should not be read as limiting the scope of this invention, as further features and benefits will be obvious to one skilled in the art. This invention should be read as limited by the claims only.

We claim:

1. A hydrostatic drive device, comprising:
   a hydrostatic transmission mounted in a housing, wherein the hydrostatic transmission comprises:
      a center section mounted entirely within the housing and having a pump running surface, a motor running surface and hydraulic porting formed therein,
      a rotatable hydraulic pump block located on the pump running surface of the center section; and
      a rotatable hydraulic motor block located on the motor running surface of the center section;
   a pump shaft extending into the housing to drive the pump block;
   a mounting flange located on the housing for connecting the housing to a separate axle driving apparatus; and
   an output shaft driven by the hydrostatic transmission and extending out of the housing and through the mounting flange, wherein the longitudinal axis of the output shaft is perpendicular to the longitudinal axis of the pump shaft and no more than one output shaft extends from the housing.

2. A hydrostatic drive device as set forth in claim 1, wherein the pump shaft extends through the center section and drives a separate charge pump.

3. A hydrostatic drive device as set forth in claim 2, wherein the charge pump is mounted on an external surface of the housing.

4. A hydrostatic drive device as set forth in claim 1, wherein the housing comprises a first housing member joined to a second housing member at a junction surface that is parallel to the longitudinal axis of the output shaft.

5. A hydrostatic drive device comprising:
   a housing comprising an upper housing member joined to a lower housing member at a junction surface;
   a center section mounted within the housing and having hydraulic porting formed therein;
   a hydraulic pump and a hydraulic motor located on the center section and in fluid communication with each other through the hydraulic porting;
   an input shaft extending into the upper housing member to drive the hydraulic pump;
   an output shaft located in the housing perpendicular to the input shaft and driven by the hydraulic motor, wherein the output shaft extends out of the upper housing member and no more than one output shaft extends from the housing; and
   a charge pump mounted to an exterior surface of the lower housing member.

6. A hydrostatic drive device as set forth in claim 5, wherein the charge pump receives fluid from a sump.

7. A hydrostatic drive device as set forth in claim 6, wherein the sump is internal to the housing.

8. A hydrostatic drive device as set forth in claim 6, wherein the sump is external to the housing.

9. A hydrostatic drive device as set forth in claim 5, further comprising an external sump and a filter fluidly connected to the charge pump, wherein the charge pump receives filtered fluid from the sump.

10. A hydrostatic drive device as set forth in claim 5, wherein the lower housing member and center section form a gallery.

11. A hydrostatic drive device as set forth in claim 5, wherein an interior gallery is formed between an inner surface of the housing and the center section and an exterior gallery is formed between an outer surface of the housing and the charge pump with a passage formed through the housing connecting the exterior gallery to the interior gallery.

12. A hydrostatic drive device as set forth in claim 5, wherein an auxiliary pump is mounted proximate to the charge pump.

13. A hydrostatic drive device comprising:
   a housing comprising an upper housing member joined to a lower housing member at a junction surface;
   a mounting flange for attachment to an axle driving apparatus, the mounting flange being integrally formed with one of the housing members;
   a center section mounted within the housing and having hydraulic porting formed therein;
   a hydraulic pump and a hydraulic motor located on the center section in fluid communication with each other through the hydraulic porting;
   a single input shaft having a first end located outside the housing and a second end extending into the housing and driving the hydraulic pump; and
   an output shaft mounted in the housing perpendicular to the input shaft and driven by the hydraulic motor, wherein no more than one output shaft extends from the housing.

14. A hydrostatic drive device as set forth in claim 13, further comprising a charge pump mounted to an exterior surface of the housing such that the center section is positioned between the charge pump and first end of the input shaft.

15. A hydrostatic drive device as set forth in claim 14, wherein an interior gallery is formed between the center section and an interior wall of the housing.

16. A hydrostatic drive device as set forth in claim 15, wherein an exterior gallery is formed between an exterior wall of the housing and the charge pump, and wherein a passage through the housing wall connects the interior gallery to the exterior gallery.

17. A hydrostatic drive device as set forth in claim 14, wherein an auxiliary pump is mounted proximate the charge pump.

18. A hydrostatic drive device comprising:
   a housing with a mounting flange for attachment to an axle driving device;
   a center section mounted within the housing and comprising hydraulic porting;
   a hydraulic pump and a hydraulic motor located on the center section in fluid communication with each other through the hydraulic porting;
   an input shaft driving the hydraulic pump and extending from the housing;
   an output shaft perpendicular to the input shaft and driven by the hydraulic motor, wherein no more than one output shaft extends from the housing; and
   a charge pump mounted to an exterior surface of the housing opposite where the input shaft extends from the housing.

19. A hydrostatic drive device as set forth in claim 18, wherein a gallery is formed exterior to the housing between a porting plate and the center section.

20. A hydrostatic drive device as set forth in claim 18, wherein the center section contains a pressure relief valve positioned between the gallery and a sump formed by the housing.